US012783557B2

(12) United States Patent
Melamed et al.

(10) Patent No.: US 12,783,557 B2
(45) Date of Patent: Nov. 3, 2026

(54) SKILL-CENTRIC ENTITY EMBEDDING AND RANKING

(71) Applicant: Microsoft Technology Licensing, LLC, Redmond, WA (US)

(72) Inventors: Ilya Dan Melamed, New York, NY (US); Rui Kou, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 16 days.

(21) Appl. No.: 18/589,427

(22) Filed: Feb. 28, 2024

(65) Prior Publication Data

US 2025/0272314 A1 Aug. 28, 2025

(51) Int. Cl.

*G06F 16/31* (2019.01)
*G06F 16/335* (2019.01)
*G06F 16/34* (2019.01)

(52) U.S. Cl.

CPC .......... *G06F 16/313* (2019.01); *G06F 16/335* (2019.01); *G06F 16/345* (2019.01)

(58) Field of Classification Search

CPC ..... G06F 16/313; G06F 16/335; G06F 16/345
See application file for complete search history.

(56) References Cited

U.S. PATENT DOCUMENTS 11,868,727 B2 * 1/2024 Vu .................. G06V 30/19147
2014/0297746 A1 * 10/2014 Cheng .................... H04L 65/40 709/204
2022/0245161 A1 * 8/2022 Ahmed ............. G06F 16/24578
2023/0394391 A1 * 12/2023 Gandhi .......... G06Q 10/063112
2024/0320476 A1 * 9/2024 Chandrasekaran .... G06N 20/00
2024/0330863 A1 * 10/2024 Hajarnis ............ G06Q 10/1053
2025/0061529 A1 * 2/2025 Saldivar, III ......... G06Q 50/205
2025/0123841 A1 * 4/2025 Dolga ....................... G06F 8/77

OTHER PUBLICATIONS

Liu et al. 2022. Few-shot parameter-efficient fine-tuning is better and cheaper than in-context learning. In Proceedings of the 36th International Conference on Neural Information Processing Systems (NIPS '22). Red Hook, NY, USA, Article 142, 1950-1965 (Year: 2022).*

Khanh Nguyen, Mike Zhang, Syrielle Montariol, and Antoine Bosselut. 2024. Rethinking Skill Extraction in the Job Market Domain using Large Language Models. In Proceedings of the First Workshop on Natural Language Processing for Human Resources (NLP4HR 2024), pp. 27-42. (Year: 2024).*

* cited by examiner

*Primary Examiner* — Brittany N Allen
(74) *Attorney, Agent, or Firm* — NICHOLSON DE VOS WEBSTER & ELLIOT LLP

(57) ABSTRACT

Embodiments extract a key phrase from an online profile of a user of a professional social network (PSN) and identify a set of skills associated with the key phrase. A set of skill embeddings corresponding to the identified set of skills may be retrieved from a store of skill embeddings. The skill embeddings may be pre-created by a large language model (LLM). The retrieved skill embeddings may be aggregated to create a skill-centric digital representation of the user. Based on the skill-centric digital representation of the user, a subset of digital documents may be identified to present to the user via the PSN.

20 Claims, 7 Drawing Sheets

600

SKILL-CENTRIC ENTITY EMBEDDING AND RANKING

TECHNICAL FIELD

A technical field to which the present disclosure relates is digital content distribution through online systems. Another technical field to which the present disclosure relates is embedding generation.

COPYRIGHT NOTICE

This patent document, including the accompanying drawings, contains material that is subject to copyright protection. The copyright owner has no objection to the facsimile reproduction of this patent document, as it appears in the publicly accessible records of the United States Patent and Trademark Office, consistent with the fair use principles of the United States copyright laws, but otherwise reserves all copyright rights whatsoever.

BACKGROUND

Software applications can use computer networks to distribute digital content among computing devices on a very large scale. Content distribution systems, such as social media platforms, can regularly receive and distribute millions of content items to hundreds of millions of user devices worldwide, every day. The content items received and distributed by online systems can include text, images, audio, video, and combinations of different forms of digital content.

BRIEF DESCRIPTION OF THE DRAWINGS

The disclosure will be understood more fully from the detailed description given below and from the accompanying drawings of various embodiments of the disclosure. The drawings are for explanation and understanding only and should not be taken to limit the disclosure to the specific embodiments shown.

DETAILED DESCRIPTION

Figure 1:
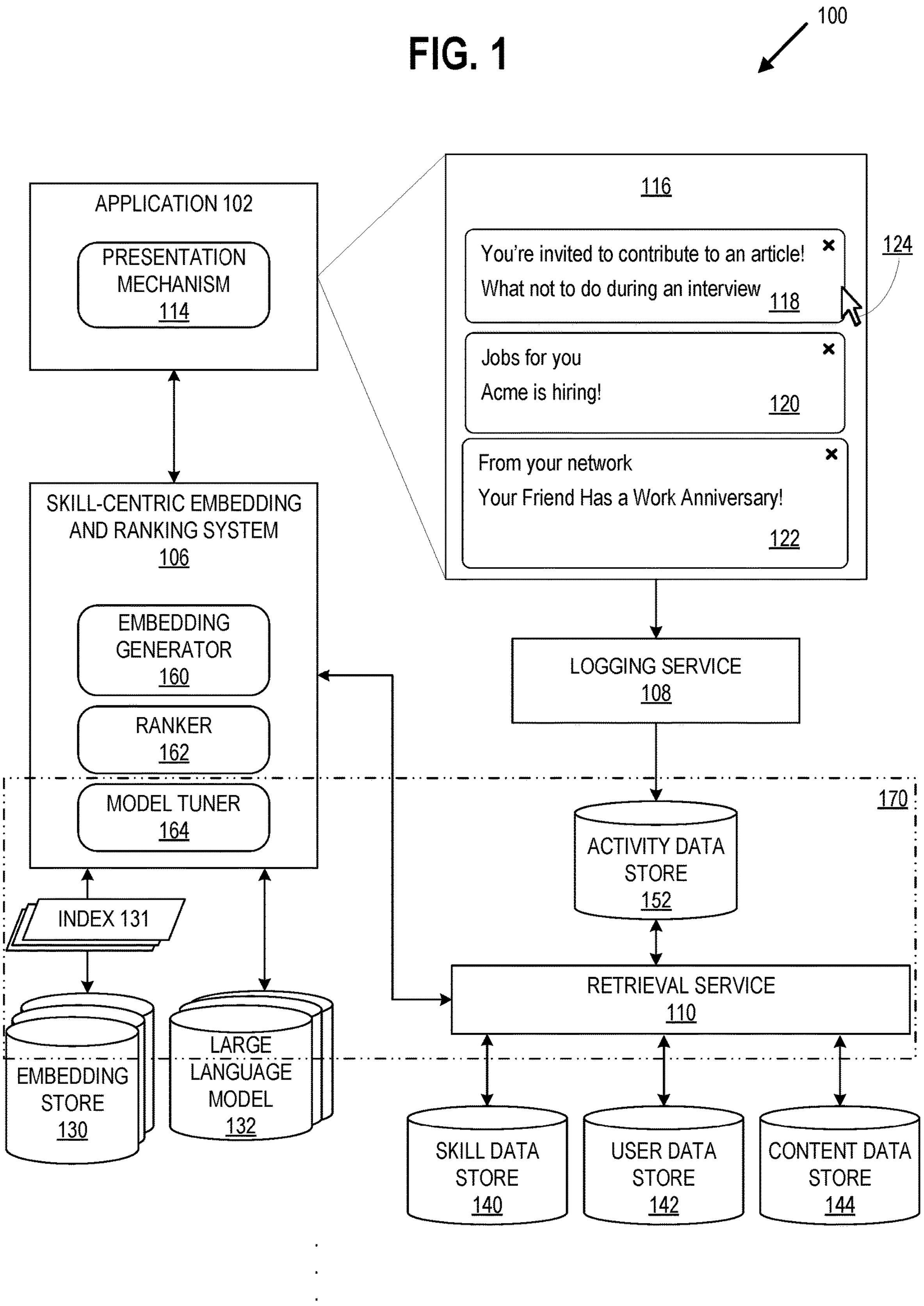
FIG. 1 is a flow diagram of an example method for skill-centric embedding and ranking using components of a skill-centric embedding and ranking system in accordance with some embodiments of the present disclosure.

The usefulness of a content distribution system is determined in large part by how well the system matches the content of digital items to users' interests, preferences, and purposes for using the system. Efficient and relevant matching and ranking is especially important when digital items are proactively "pushed" to users. The term push refers to a system's capability of sending content items, such as notifications, messages, recommendations, and feed items, directly to a user's computing device without a specific request from the user's device, either through an application, such as a social media service, or via the device's operating system. Because digital items that are pushed to users are likely to gain the user's attention and are likely to take up valuable real estate on the user's display screen, those content items need to be generally helpful or interesting to the user and not an annoyance.

A professional social network (PSN) is a business and/or employment-focused social media platform that is primarily used for professional networking and career development. For example, a PSN can allow job seekers to post resumes and enable employers to post jobs. A PSN can also or alternatively allow various users, companies, recruiters, educational institutions, and other entities to share and distribute many different types of digital content, such as articles, status updates, press releases, comments, meeting recaps, and educational materials.

A ranking component of the PSN (or other online system) can execute one or more ranking tasks. The ranking component takes in data about users and content items and, for each user, algorithmically ranks content items in descending order of relevance to the user based on the data it has received about the user and the content items. The ranking component thereby generates, for each user, a prospective list of content items that appear to match the user's interests or preferences and potentially could be displayed to the user in accordance with a particular downstream task. A presentation mechanism uses the ranking data produced by the ranking component to select content items from the prospective list and determine the order, arrangement, and format of content items that are ultimately presented to the user. This automated process of matching and ranking content items for presentation to users can be repeated daily or even multiple times a day for hundreds of millions of users and/or thousands or more content items.

Given a pair of entities, such as a user and a prospective content item, match as used herein can refer to a machine-determined predicted or estimated degree of relevance, similarity or compatibility between those entities that satisfies (e.g., meets or exceeds) a threshold level of relevance, similarity or compatibility, where the threshold level of relevance, similarity or compatibility is variable based on the requirements of a particular design or implementation. The threshold level of relevance, similarity or compatibility may be set lower or higher for different types of matching. For example, a relevance threshold may be set to a higher value when content items are ranked for push notifications or to a lower value when content items are ranked for inclusion in a user's feed. As another example, a matching threshold may be set to a higher value to identify users as prospective article contributors or to a lower value to match users with educational articles that address gaps in the users' skill sets.

To produce a prospective list of content items for a user, embeddings can be used as proxies for raw data about users and content items. Embedding as used herein may refer to a concise or compressed numerical representation of information. An embedding may encode information associated with a user and/or a content item relative to an embedding space. Embeddings and embedding spaces can be generated by artificial intelligence (AI) models. An embedding can be expressed as a vector, where each dimension of the vector includes a floating point value. The value assigned to a given dimension of the vector conveys information about the data represented by the embedding, relative to the embedding space, also referred to as a vector space. The embedding space (or vector space) includes all of the possible values of each dimension of the embedding.

The embedding space is defined by the way in which the AI model used to generate the embedding has been trained and configured, including the training data used to train the AI model. In some implementations, train as used herein refers to an iterative process of applying a predictive algorithm (e.g., based on probabilities or statistics) to one or more sets of training data, analyzing the output of the AI model in comparison to expected model output using a loss function (also referred to as a cost function or error function), adjusting one or more parameters and/or coefficients of the predictive algorithm, and repeating the process until the difference between the actual model output and the expected model output falls within an acceptable range of error or tolerance.

Embedding-based retrieval (EBR) is a method of searching for matching digital content, such as content items that match a user's current preferences and interests. Embedding-based retrieval involves converting data to embeddings and then using a similarity algorithm, such as nearest-neighbor search or cosine similarity, to identify embeddings that match one another in accordance with the applicable matching criteria or parameters.

In the context of auto-generating prospective lists of content items for users, EBR can be used to search for, identify, and retrieve content item embeddings that most closely match user embeddings. For example, embeddings can be generated for users and content items, and then EBR can be used to identify, for each user, a prospective set of content items based on the respective content item embeddings.

In EBR-based systems, the quality of the embeddings and the processes used to generate the embeddings are factors that influence match prediction accuracy. Embeddings that do not represent the features of an entity that are important predictors for a specific task will not produce optimal match predictions. For example, conventional embeddings used to match users with digital content items may be generated based on a user's entire profile and the entire contents of a document, which, while including a large amount of information, may obscure the more precise pieces of information that are most relevant for a particular matching application or use case.

In one such use case, a PSN (or other online system) may, through an automated process, electronically invite users to contribute digital content to a pre-created content item. For example, the system may auto-generate article "starters" (e.g., using a generative artificial intelligence model) and then invite users to supplement the article by adding their own perspectives via the online system. In this case and other use cases, a certain degree of accuracy is needed to match users' professional backgrounds and interests with the relevant subject matter of the pre-created digital content items. If the system invites users to contribute to articles that are not related to the users' skills and experience, computing resources are wasted on generating unproductive matches, and the user is likely to ignore the invitation and lose trust in the system's capabilities.

To address these and other challenges, as described in more detail below, embodiments generate skill-centric user embeddings and skill-centric document embeddings, and perform matching and ranking based on the skill-centric embeddings. A large language model (LLM) is used to generate skill embeddings and the skill embeddings generated by the LLM are incorporated into the user and document embeddings in a way that optimizes the use of the LLM by reducing the number of calls that need to be made to the LLM.

The described approaches use skill-centric embeddings to address the difficulty of efficient entity matching at scale such as matching millions of users to content items on a daily basis. In some particular embodiments, the described approaches improve the ability to match users' actual expertise with timely topics, so that people who actually possess skills that make them experts are effectively matched with and invited to contribute to articles on topics related to those skills. For example, in some professional social networks, skill-centric embedding generation approaches described herein enable aggregation efficiently and accurately, improving upon conventional approaches in which lack of precision in the matching of subject matter experts to articles to which they are likely to be able to offer valuable contributions is caused by poorly structured embeddings and/or poor quality embedding-based retrieval. To address these and/or other shortcomings of prior approaches, LLM prompts are configured to generate expansions of skills, enabling more comprehensive skills matching. As a result, ranking the top skills embeddings leads to improved accuracy in the entity matching.

Experiments have shown that using the described approaches to embedding generation has reduced the amount of noise in the embeddings and improved matching and ranking as a result. The described approaches can reduce the amount of data that needs to be input into embedding generation processes while generating higher quality embeddings based on a smaller or more focused, less noisy, amount of input data. By reducing the noise in the data required to be input into the embedding generation processes, the described approaches can also reduce the possibility of bias in the embeddings, and thus reduce the likelihood that any biases will be propagated to downstream matching and ranking.

Embodiments of disclosed approaches may be described in the context of a professional social network and more particularly in the context of using skill data to generate skill-centric embeddings for users and digital content items. However, these contexts are provided for illustrative purposes. The disclosed approaches are not limited to the specific contexts in which they are described. For example, aspects of the disclosed approaches are not limited to professional social networks, but can be used for ranking and matching in other types of online systems. Further, aspects are not limited to matching content items with users but rather can be applied to other entity matching contexts. Still further, aspects are not limited to the use of skill data as the basis for generating user and/or content item embeddings; other types of entity attributes can be used in place of or in addition to skills.

Terms such as document and content item may be used interchangeably, and references to documents and/or content items may refer to digital files including one or more types of digital content such as text (e.g., unstructured natural language text), imagery, video, audio, graphics, or any combination of any of the foregoing and/or other types of digital content.

In the drawings and the following description, references may be made to components that have the same name but different reference numbers in different figures. The use of different reference numbers in different figures indicates that the components having the same name can represent the same embodiment or different embodiments of the same component. For example, components with the same name but different reference numbers in different figures can have the same or similar functionality such that a description of one of those components with respect to one drawing can apply to other components with the same name in other drawings, in some embodiments.

Also, in the drawings and the following description, components shown and described in connection with some embodiments can be used with or incorporated into other embodiments. For example, a component illustrated in a certain drawing is not limited to use in connection with the embodiment to which the drawing pertains, but can be used with or incorporated into other embodiments, including embodiments shown in other drawings.

FIG. 1 illustrates a flow diagram of an example method for skill-centric embedding and ranking using components of a skill-centric embedding and ranking system in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of a skill-centric embedding and ranking system, including, in some embodiments, components or flows shown in FIG. 1 that may not be specifically shown in other figures and/or including, in some embodiments, components or flows shown in other figures that may not be specifically shown in FIG. 1. Although shown in a particular sequence or order, unless otherwise specified, the order of the processes can be modified. Thus, the illustrated embodiments should be understood only as examples, and the illustrated processes can be performed in a different order, and some processes can be performed concurrently. Additionally, at least one process can be omitted in various embodiments. Thus, not all processes are required in every embodiment. Other process flows are possible.

In FIG. 1, the method is performed by an example computing system 100, which includes an example skill-centric embedding and ranking system 106. In the example of FIG. 1, the components of the computing system including the skill-centric embedding and ranking system are implemented using an application server or server cluster, which can include a secure environment (e.g., secure enclave, encryption system, etc.) for the processing of data. In some implementations, one or more components of the skill-centric embedding and ranking system are implemented on a client device, such as a user system running an application 102, alone or in combination with one or more servers. For example, some or all of skill-centric embedding and ranking system 106 is implemented directly on the user's electronic device in some implementations, thereby avoiding the need to communicate with servers over a network such as the Internet. In some implementations, the skill-centric embedding and ranking system is in bidirectional communication with one or more applications, e.g., application 102, via a computer network. The one or more applications include front end user interface functionality that, in some embodiments, is considered part of or is in communication with skill-centric embedding and ranking system 106.

In the embodiment of FIG. 1, the computing system 100 includes structural components (e.g., computer programs and/or data structures), including application 102, skill-centric embedding and ranking system 106, a logging service 108, a retrieval service 110, an embedding store 130, an index 131, one or more large language models 132, a skill data store 140, a user data store 142, a content data store 144, and an activity data store 152.

Application 102 includes a presentation mechanism 114. In operation, presentation mechanism 114 causes presentation of output, including output generated via matching system 104. In the example of FIG. 1, the presentation is in the form of a visual display 116, e.g., one or more push notifications, a feed, an inbox, a set of recommendations, or a list of content items, but other implementations are possible. The display (or other form of presentation) 116 contains one or more presentation positions at which digital entities, such as messages, invitations, recommendations, user profiles, job postings, articles, posts, and/or other types of content items, can be presented to the user of application 102.

In the example of FIG. 1, application 102 is or includes a professional social network (PSN) and the visual display 116 includes a ranked list of PSN-related digital content items, such as invitations to contribute to articles, job alerts, and business or social connection-related notifications. Content item 118 includes an invitation to contribute to an article presented at a first position, content item 120 includes a job posting presented at a second position different from the first position, and content item 122 includes a notification presented at a third position different from the first and second positions. While the display 116 includes content items of different types, the display can be configured to display only one type of content at a time; for example, in some applications the display 116 may display a ranked list of article contribution recommendations without displaying other types of content items in the same list.

The number of available presentation positions on the visual display 116 can vary based on the requirements or design of the application 102 or the specific task (e.g., the task of generating article contribution invitations), and/or can be constrained by one or more aspects of the computing environment and/or other factors. For example, a mobile device environment with a relatively small display screen may have fewer available positions than a laptop or desktop environment having a larger display screen. As another example, a message inbox may have more available positions than a notification center or a list presented via machine-generated audio. The assignment of content items to positions can be based on embeddings generated by skill-centric embedding and ranking system 106.

The logging service 108 logs signals that are received from the application 102 and/or from the presentation mechanism 114, as the user interacts with the display (or other type of presentation mechanism) 116. For example, the user may activate a selection mechanism 124 at the first position to view or otherwise manipulate the content item 118 or the user may scroll through the presented entities without selecting any entities. Logging service 108 tracks signals associated with each content item. For instance, if the user selects content item 118, logging service 108 may log [0, 1], indicating that a positive signal was received for the content item 118. If instead the user keeps scrolling past content item 118 without selecting content item 118, logging service 108 may log [0,0], indicating that a negative signal or no signal was received for the content item 118. Logging service 108 continues to log these and other types of online activity signals throughout the user's login session and, in some cases, across multiple user sessions.

Logging service 108 generates an interaction log such as the example described above for each session of each user of application 102 and stores the logged data in an activity data store 152. An interaction log can contain any amount of interaction data collected over a time interval of any duration for any number of users. For example, an interaction log can contain information about a specific application in use (e.g., the PSN), downstream objective (e.g., knowledge search, knowledge contribution, job search, etc.) and/or the operational context, e.g., a computing environment associated with the interaction data, such as whether the interaction occurred on a mobile device or larger computer, or whether the interaction occurred within a browser version of the application 102 or a mobile app version of the application 102. The interaction data can be grouped or filtered by one or more contextual or computing environment parameters. From time to time, as described in more detail below, skill-centric embedding and ranking system 106 may retrieve interaction data created by logging service 108 and stored in activity data store 152 via retrieval service 110.

In operation, a ranker component 162 of the skill-centric embedding and ranking system 106 generates and supplies ranking data, such as matching scores and associated user-content item pairs, to application 102. Presentation mechanism 114 assigns content items to presentation positions of the display (or other presentation mechanism) 116 presented to the user based on the output of the ranker component 162. The assignment of content items to presentation positions is on one-to-one basis in that a content item is assigned to only one presentation position at a time, and a presentation position has only one assigned content item at a time.

To generate matching scores, the ranker component 162 uses embeddings generated by an embedding generator component 160 of the skill-centric embedding and ranking system 106. The embedding generator component 160 generates skill-centric embeddings for users and content items using the techniques described herein. Data used by embedding generator component 160 to generate the skill-centric embeddings for users and content items can be supplied to embedding generator component 160 via retrieval service 110.

Retrieval service 110 is configured to process requests, configure and execute search queries, and retrieve, from one or more searchable data stores (e.g., skill data store 140, user data store 142, content data store 144) input data for embedding generator component 160, from which embeddings may be created using the described approaches.

The embedding generator 160 may interact with one or more large language models (LLMs) 132 to produce one or more embeddings, as described in more detail below. A large language model (LLM) is a type of generative language model that is trained using an abundance of data (e.g., publicly available data) such that billions of hyperparameters that define the LLM are used to learn a task. Some pretrained LLMs, such as generative pretrained transformers (GPT) can be trained to perform tasks including natural language processing (NLP) tasks such as text extraction, text translation (e.g., from one language to another), text summarization, and text classification.

In some implementations, one or more of the LLMs 132 includes a pre-trained component. Examples of pre-trained LLMs include open source LLMs such as LLAMA 2. Additional discussion of large language models and their configuration and use by skill-centric embedding and ranking system 106 are provided in more detail below.

In some implementations, a model tuner component 164 of skill-centric embedding and ranking system 106 fine tunes one or more of the LLMs 132 based on downstream activity occurring in response to presentations of content items made by application 102 based on embeddings and rankings of content items generated and provided by skill-centric embedding and ranking system 106. For example, model tuner 164 can initially and/or periodically execute a fine tuning process 170 on a pre-trained LLM 132. In some implementations, reinforcement learning is used to customize the output of an LLM for a particular domain or application (e.g., for a PSN generating article contribution invitations). In reinforcement learning, ground-truth examples of desired model output are paired with respective prompts, and these prompt-output pairs are used to train or fine tune the LLM.

In some implementations, an LLM 132 is a general-purpose LLM that has been trained on a large corpus of data that might not be specific to any particular domain or application (e.g., the LLM 132 may be a general purpose and/or open source LLM that has not been specifically trained on data pertaining to a PSN).

During the fine tuning process 170, model tuner 164 creates a set of training data based on downstream signals collected by logging service 108 and obtained from activity data store 152 via retrieval service 110. Illustrative examples of downstream signals include article engagement (e.g., did a user view, like, react to, comment on, contribute to, long dwell on, or share this article?), related article engagement (e.g., if the user did not engage with this article, did they engage with any of these other articles that are topically related?), and aggregate engagement over a population of users. Downstream signals can be positive or negative. In some cases, the presence of engagement (e.g., clicks, views, long dwells) is considered a positive example and lack of engagement is considered a negative example, for instance when the downstream objective is to optimize the likelihood of the user contributing to an article. In other cases, a lack of engagement (e.g., did not click, view, or long dwell) is considered a positive example and engagement is considered a negative example, e.g., when the downstream objective is to optimize serving of content that could help the user fill a skill gap. Training data can include positive examples, negative examples, or a combination of positive and negative examples, depending upon the downstream objectives.

Supervised learning is a method of training a machine learning model, such as an LLM, given input-output pairs. An input-output pair is an input with an associated known output (e.g., an expected output, a labeled output, a ground truth). Using, e.g., a supervised machine learning approach, the model tuner 164 maps downstream signals to their respective user embedding-content item embedding pairs that gave rise to those downstream signals, and creates corresponding instances of training data by aligning the downstream signals with the corresponding embedding pairs, e.g., an instance of training data could be represented as [user embedding, content item embedding, signal], where the user embedding and the content item embeddings are the input and the signal is the known output because the signal is the actual result of presentation of the content item associated with the skill-centric content item embedding produced via the described approaches to the user associated with the skill centric user embedding produced via the described approaches. The training data can be appended to or incorporated into a prompt such that when the prompt is input to the LLM, the training data is included in the model input.

The LLM 132 can be set to a training mode in which one or more internal parameters of the LLM 132 can be adjusted based on training data, and prompts including instances of training data created based on the downstream signals can be input to the LLM 132 in the training mode. During the fine tuning process 170, when the LLM 132 is in the training mode, one or more internal parameters of the LLM 132 can be adjusted in response to the training data.

For example, during the fine tuning process 170, the values of one or more parameters of the LLM 132 can be increased or decreased based on the training data so that the output of the LLM 132 is optimized for one or more downstream objectives, e.g., to increase user engagement with the content items presented to the user. For instance, suppose a skill-centric user embedding created based on output of the pre-trained LLM 132 resulted in a high probability match between a particular user and a particular content item, but a downstream signal indicates that the user did not engage with the content item. In this example, one or more parameters of the LLM 132 might be adjusted so that a subsequent skill-centric embedding created for that user using output of the LLM 132 will be less likely to match the content item embedding for the content item with which the user did not interact and/or similar content items.

The fine tuning process 170 can be repeated periodically as downstream signals are collected by logging service 108 and logged in activity data store 152. For example, using the described approaches, skill-centric user embeddings can be efficiently re-generated periodically in response to fine tuning of the LLM 132, e.g., on a daily basis. After the fine tuning, the LLM 132 may be set to an operational mode in which one or more of the internal parameters of the LLM 132 are not adjustable based on input data.

The embeddings produced by embedding generator 160 may be stored in one or more embedding stores 130. For example, certain embeddings produced via skill-centric embedding and ranking system 106 can be pre-created, e.g., via one or more offline processes, and stored in embedding stores 130. One or more indexes 131 (e.g., reverse indexes) may be created to enable fast retrieval of embeddings from embedding stores 130, for example at online serving time. For instance, at the start of a session (e.g., when a user logs in to application 102), an index 131 of content item embeddings may be queried at or prior to serving time to identify a set of content items matching the user's current skill-centric user embedding.

Embodiments of skill-centric embedding and ranking system 106 improve upon prior embedding approaches by, for example, incorporating a large language model into the embedding generation process in an efficient way that minimizes calls to the LLM and reduces the amount of input data required to produce high quality embeddings. Quality as used here refers to an objective standard such as a measurable performance metric of a downstream objective, such as statistics relating to user engagement, views, article contributions, and/or other metrics.

The examples shown in FIG. 1 and the accompanying description above are provided for illustration purposes. This disclosure is not limited to the described examples. Additional or alternative details and implementations are described herein.

Figure 2:
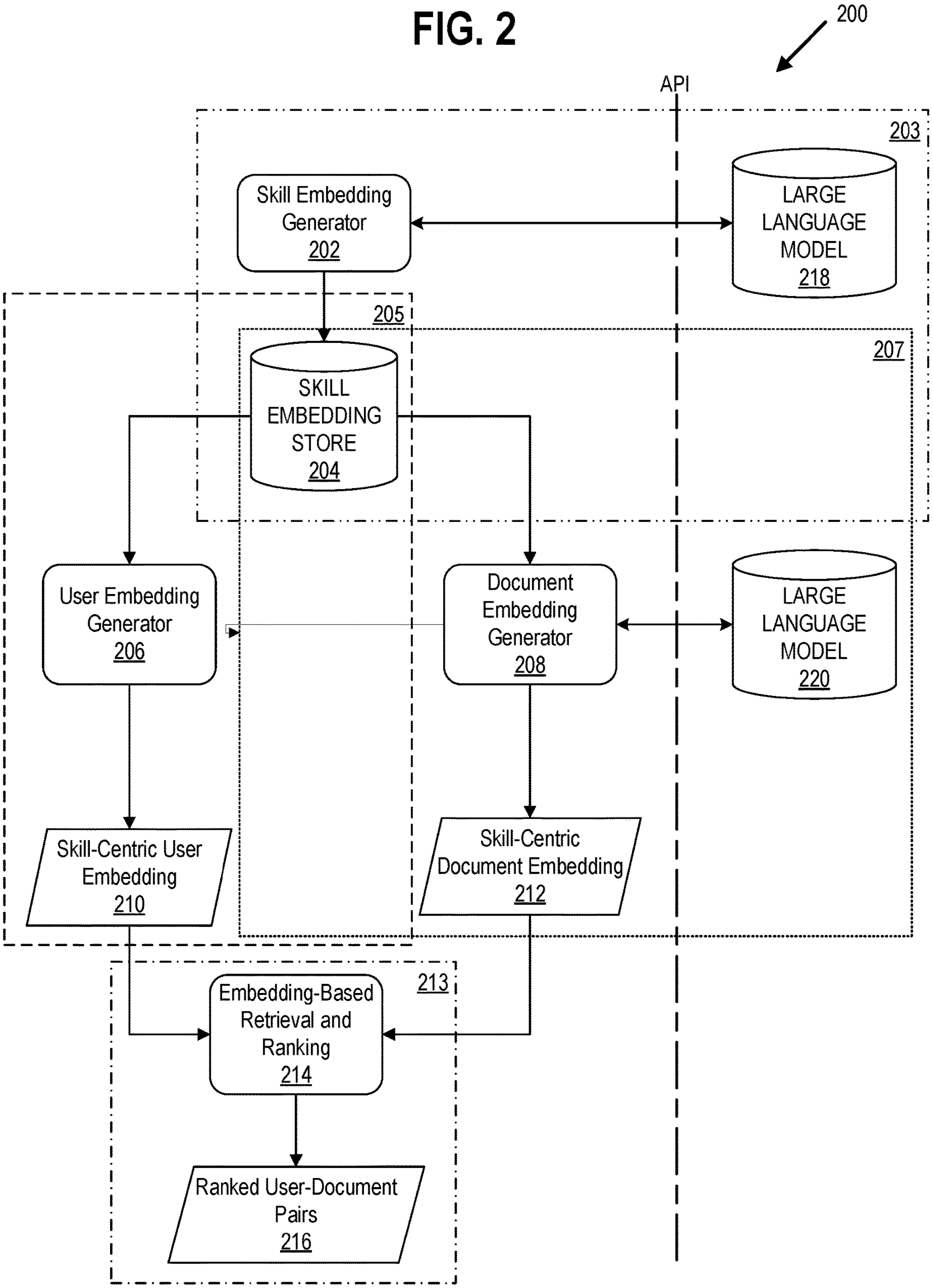
FIG. 2 is a flow diagram of an example method for skill-centric embedding generation and ranking using components of a skill-centric embedding and ranking system in accordance with some embodiments of the present disclosure.

FIG. 2 is a flow diagram of an example method for skill-centric embedding generation and ranking using components of a skill-centric embedding and ranking system in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of a skill-centric embedding and ranking system, including, in some embodiments, components or flows shown in FIG. 2 that may not be specifically shown in other figures and/or including, in some embodiments, components or flows shown in other figures that may not be specifically shown in FIG. 2. Although shown in a particular sequence or order, unless otherwise specified, the order of the processes can be modified. Thus, the illustrated embodiments should be understood only as examples, and the illustrated processes can be performed in a different order, and some processes can be performed concurrently. Additionally, at least one process can be omitted in various embodiments. Thus, not all processes are required in every embodiment. Other process flows are possible.

Figure 3:
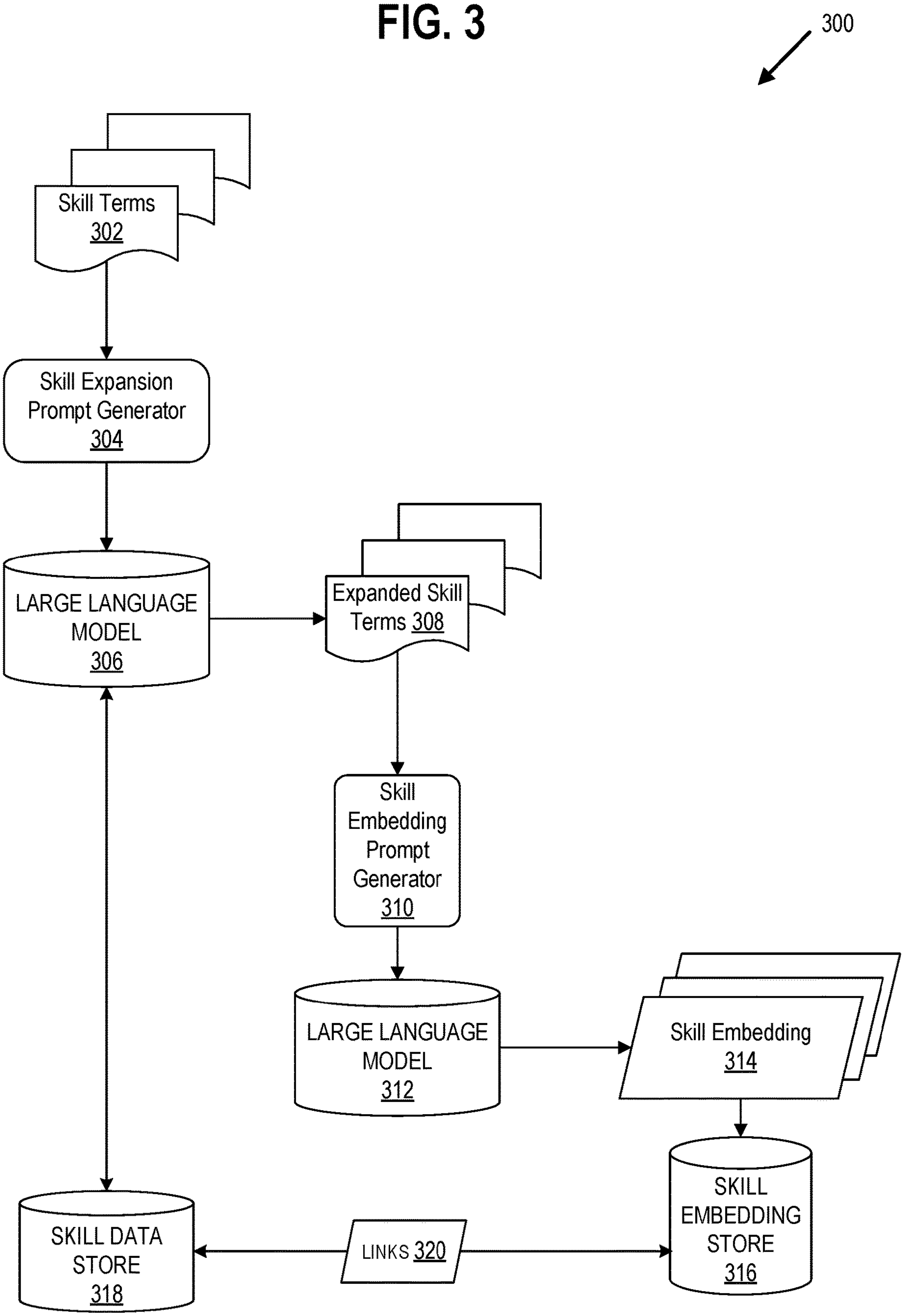
FIG. 3 is a flow diagram of an example method for generating skill embeddings using components of a skill-centric embedding and ranking system and one or more large language models in accordance with some embodiments of the present disclosure.
Figure 4:
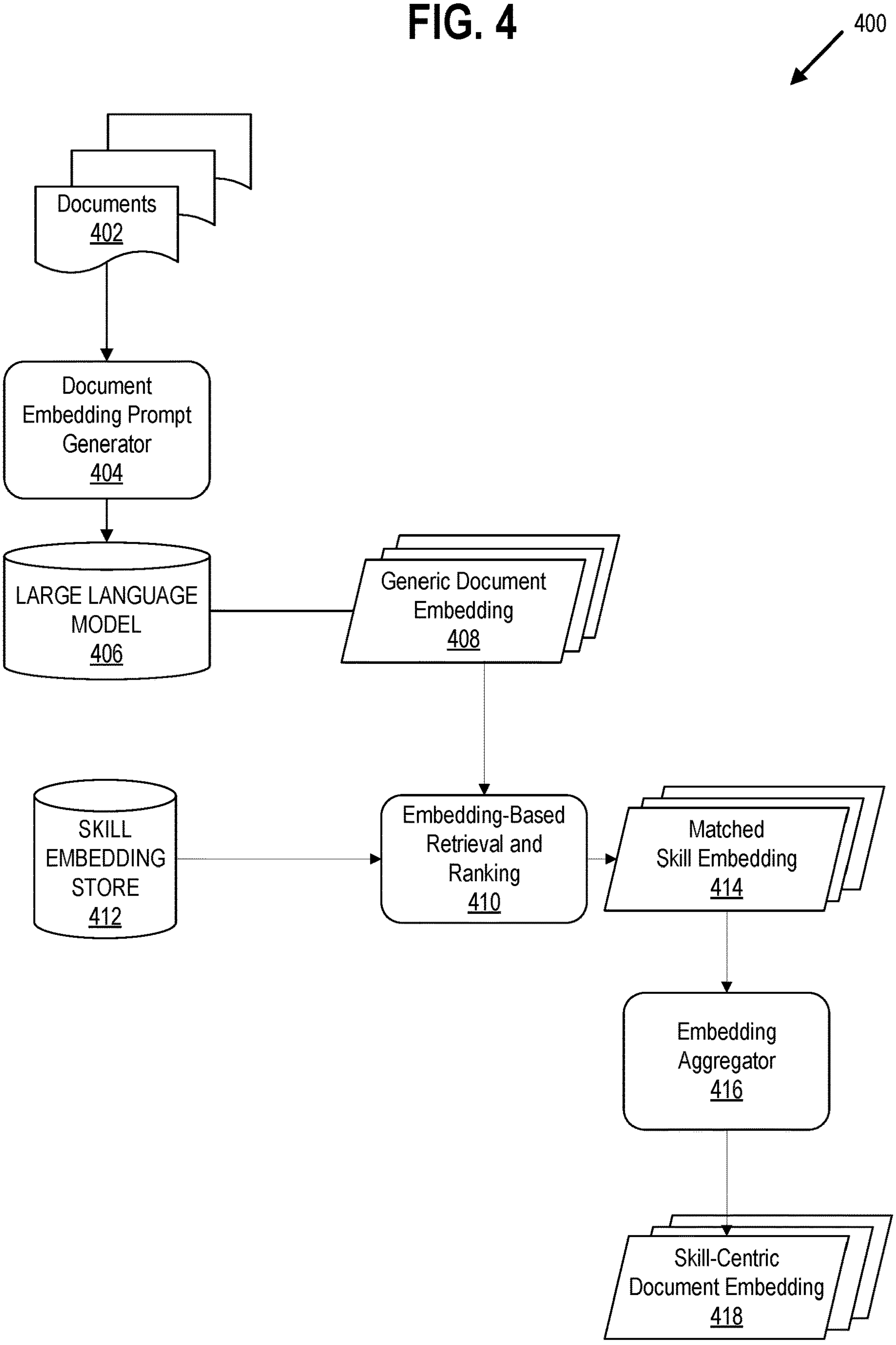
FIG. 4 is a flow diagram of an example method for generating skill-centric document embeddings using components of a skill-centric embedding and ranking system and a large language model in accordance with some embodiments of the present disclosure.
Figure 5:
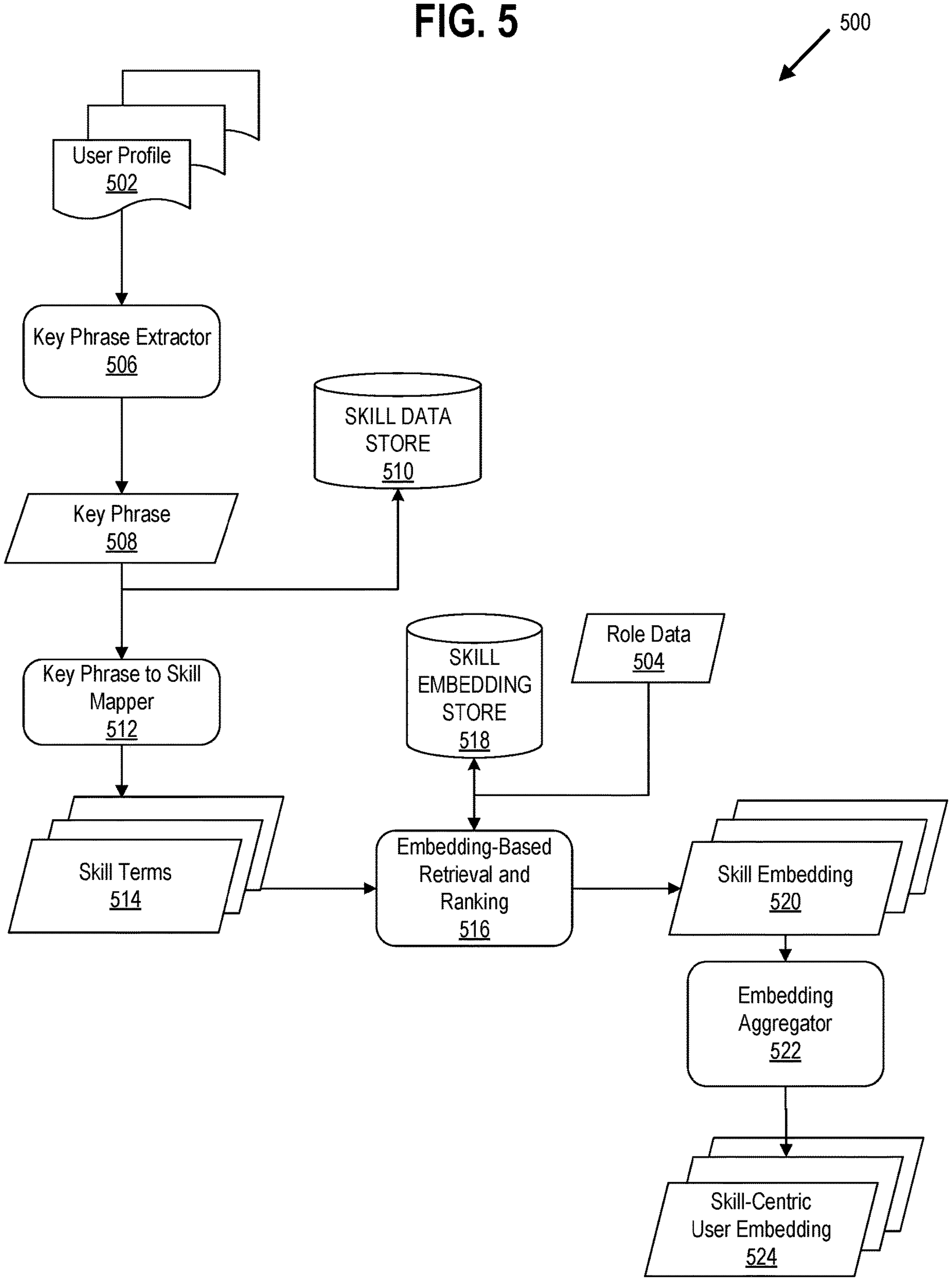
FIG. 5 is a flow diagram of an example method for generating skill-centric user embeddings using components of a skill-centric embedding and ranking system in accordance with some embodiments of the present disclosure.

In FIG. 2, an embodiment of a skill-centric embedding and ranking system 200 includes structural components (e.g., computer programs and/or data structures), including a skill embedding generator 202, a skill embedding store 204, a user embedding generator 206, a document embedding generator 208, a skill-centric user embedding 210, a skill-centric document embedding 212, an embedding-based retrieval and ranking component 214, ranked user-document pairs 216, and one or more large language models 218, 220. Skill embedding generator 202, user embedding generator 206, and document embedding generator 208 can be implemented as components of embedding generator 160, described above. Skill embedding store 204 can be implemented as a component of embedding store 130, described above. An example of a skill embedding generator 202 is shown in FIG. 3, described below. An example of a document embedding generator 208 is shown in FIG. 4, described below. An example of a user embedding generator 206 is shown in FIG. 5, described below.

Large language models 218, 220 can be implemented as components of LLMs 132, described above, or as other types of large language models. LLMs 218, 220 can be implemented as the same LLM or as different LLMs, depending upon the requirements of a particular design or implementation of the skill-centric embedding and ranking system 200.

Embodiments of LLMs 218, 220 can be implemented using one or more generative models. A generative model uses artificial intelligence technology to machine-generate new digital content based on model inputs and the data with which the model has been trained. Whereas discriminative models are based on conditional probabilities P (y|x), that is, the probability of an output y given an input x, generative models capture joint probabilities P (x, y), that is, the likelihood of x and y occurring together.

A generative language model is a type of generative model that is capable of automatically generating unstructured, conversational natural language text and/or other output in response to model input. A large language model (LLM) is a type of generative language model that is trained in an unsupervised way on massive amounts of unlabeled data, such as publicly available texts extracted from the Internet, using deep learning techniques. A large language model can be configured to perform one or more natural language processing (NLP) tasks, such as generating text, classifying text, answering questions in a conversational manner, and translating text from one language to another.

An LLM can be constructed using a neural network-based machine learning model architecture. In some implementations, the neural network-based architecture includes one or more input layers that receive input, e.g., task descriptions (or prompts), and one or more intermediate layers that encode the input into one or more embeddings based on the task descriptions (or prompts). The LLM can pass the one or more embeddings to one or more other, subsequent intermediate layers of the neural network, which may decode the embeddings and pass the decoded information to an output layer, which can output natural language text and/or other types of digital content.

In some implementations, the neural network-based machine learning model architecture includes one or more self-attention layers that allow the model to assign different weights to different words or phrases included in the model input. Alternatively or in addition, the neural network architecture includes feed-forward layers and residual connections that allow the model to machine-learn complex data patterns including relationships between different words or phrases in multiple different contexts. In some implementations, an LLM is constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation of the system 200.

In some examples, the neural network-based machine learning model architecture includes or is based on one or more generative transformer models, one or more generative pre-trained transformer (GPT) models, one or more bidirectional encoder representations from transformers (BERT) models, one or more large language models (LLMs), one or more XLNet models, and/or one or more other natural language processing (NL) models that are capable of performing various NLP tasks such as machine translation, sentiment analysis, question answering and sentence similarity. In some examples, the neural network-based machine learning model architecture includes or is based on one or more predictive text neural models that can receive text input and generate one or more outputs based on processing the text with one or more neural network models. Examples of predictive neural models include, but are not limited to, Generative Pre-Trained Transformers (GPT), BERT, and/or Recurrent Neural Networks (RNNs). In some examples, one or more types of neural network-based machine learning model architecture includes or is based on one or more multimodal neural networks capable of outputting different modalities (e.g., text, image, sound, etc.) separately and/or in combination based on textual input.

Generative language models, including LLMs, have technical challenges to widespread for automatically generating content at scale. Careful configuration of prompts is needed to ensure that the model does not hallucinate, i.e., diverge from a given prompt in a way that introduces irrelevant, nonsensical, inappropriate, or inconsistent information into its output. Additionally, some generative models have limits on the amount of information that can be included in a prompt. These limits can impact the quality of the model output, particularly if the prompt is not well-designed.

Prompt engineering is a technique used to optimize the structure and/or content of the prompt input to the generative model. Some prompts can include examples of outputs to be generated by the generative model (e.g., few-shot prompts), while other prompts can include no examples of outputs to be generated by the generative model (e.g., zero-shot prompts). Chain of thought prompting is a prompt engineering technique where the prompt includes a request that the model explain reasoning in the output. For example, the generative model performs the task described in the prompt using a series of steps and outputs reasoning as to each step performed.

In a process 203, the skill embedding generator 202 interfaces with LLM 218 to generate skill embeddings using, e.g., the process shown in FIG. 3, described below. For example, skill embedding generator 202 configures one or more application programming interface calls to include a skill embedding generation prompt, where the prompt is configured to cause the LLM 218 to generate and output one or more skill embeddings. The LLM 218 returns skill embeddings generated based on skill embedding generation prompts to skill embedding generator 202. Skill embedding generator 202 stores the skill embeddings in skill embedding store 204.

The process 203 can be repeated as needed to generate LLM-based skill embeddings for any number of skill terms. In some implementations, the process 203 is executed as an offline process that scans, searches, or traverses a standardized or non-standardized set of skill terms (e.g., a taxonomy, an ontology, a graph, or a tree data structure, or another type of data structure) and generates an LLM-based skill embedding for each skill term in the set of skill terms. The process 203 can be repeated in response to the addition of new skill terms to the set of skill terms. The process 203 includes at least one API call to LLM 218 per skill term.

In a process 205, user embedding generator 206 generates skill-centric user embeddings 210 for users (e.g., users of a PSN), based on the LLM-based skill embeddings stored in skill embedding store 204 using, e.g., the process shown in FIG. 4, described below. The process 205 can be repeated as needed to refresh the skill-centric user embeddings 210, e.g., as users update their online profiles. As shown in FIG. 2, user embedding generator 206 does not interface with LLM 218 or LLM 220 during the user embedding generation process 205; that is the process 205 does not include any API calls to LLM 218 or LLM 220.

In a process 207, the document embedding generator 208 interfaces with LLM 220 (which may be the same LLM as LLM 218 or a different LLM) to generate document embeddings using, e.g., the process shown in FIG. 5, described below. For example, document embedding generator 208 configures one or more application programming interface calls to include a document embedding generation prompt, where the prompt is configured to cause the LLM 220 to generate and output one or more generic document embeddings. The LLM 220 returns generic document embeddings generated based on document embedding generation prompts to document embedding generator 208. Document embedding generator 208 uses the generic document embeddings produced by LLM 220 to retrieve one or more skill embeddings from skill embedding store 204. Document embedding generator 208 creates skill-centric document embeddings 212 by identifying skill embeddings that match the generic document embeddings, and then aggregating the matching skill embeddings.

The process 207 can be repeated as needed to generate skill-centric document embeddings from the LLM-based skill embeddings for any number of documents. In some implementations, the process 207 is executed as an offline process that scans, searches, or traverses a corpus of documents (e.g., a dataset of AI generated starter articles) and generates a skill-centric document embedding for each document in the corpus. The process 207 can be repeated in response to the addition of new documents to the corpus. As shown in FIG. 2, document embedding generator 208 interfaces with LLM 220 during the document embedding generation process 207. However, the process 207 only involves one API call to the LLM 220 per document.

In a process 213, the embedding-based retrieval and ranking component 214 identifies skill-centric user embeddings 210 and skill-centric document embeddings using an embedding-based retrieval (EBR) approach. For example, upon identification of a user of an online system (e.g., a prospective contributor to an article via a PSN), embedding-based retrieval and ranking component 214 identifies the user's most recently-created skill-centric user embedding 210 and uses EBR to identify the top k skill-centric document embeddings 212 that match the user's skill-centric user embedding 210, where k is a positive integer whose value is configurable based on the requirements of a particular implementation or design of the system 200. For a given user, embedding-based retrieval and ranking component 214 creates a ranked list of documents based on the top k skill-centric document embeddings 212 matching the skill-centric user embedding 210. The embedding-based retrieval and ranking component 214 outputs ranked user-document pairs 216, which have been ranked based on the skill-centric embeddings created using the LLM-based skill embeddings. The embedding-based retrieval and ranking component 214 sends, caches, stores, or otherwise makes the ranked user-document pairs 216 accessible to one or more downstream processes, systems, components, or models; for example to application 102 or presentation mechanism 114, described above.

The process 213 can be repeated as needed for each user of the online system. For example, the process 213 can be triggered by the start of a user's login session, or the process 213 can be executed offline on a periodic basis, e.g., daily and/or as the skill-centric user embeddings 210 are refreshed or the skill-centric document embeddings 212 are refreshed. The process 213 does not include any API calls to LLM 218 or LLM 220.

Using the processes described with reference to FIG. 2 can provide an optimal use of LLMs 218, 220 to generate skill-centric embeddings having a desirable level of quality. For example, in an online system, the number of users for which skill-centric embeddings may need to be generated may be on the order of hundreds of millions per day (e.g., 600+ million users) while the number of skills for which LLM-based embeddings need to be generated is much smaller (e.g., fifty to a hundred thousand or less, on a relatively infrequent basis as the set of skills is updated) and the number of documents for which skill-centric embeddings need to be generated is smaller still (e.g., tens of thousands of documents or less, as documents are identified) . The described processes eliminate the need to use the LLM on a high volume basis; i.e., the LLM is not required for the generation of the skill-centric user embeddings for the hundreds of millions of users. Also, the LLM is only minimally required for the generation of the skill-centric document embeddings. Instead, the LLM is primarily invoked on a relatively infrequent basis for the generation of skill embeddings for a relatively well-defined or constrained set of skills (e.g., only those skills that are included in a set of standardized or non-standardized set of skills, such as a taxonomy, ontology, or graph).

The examples shown in FIG. 2 and the accompanying description, above are provided for illustration purposes. This disclosure is not limited to the described examples. Additional or alternative details and implementations are described herein.

FIG. 3 is a flow diagram of an example method for generating skill embeddings using components of a skill-centric embedding and ranking system and one or more large language models in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of a skill-centric embedding and ranking system, including, in some embodiments, components or flows shown in FIG. 3 that may not be specifically shown in other figures and/or including, in some embodiments, components or flows shown in other figures that may not be specifically shown in FIG. 3. Although shown in a particular sequence or order, unless otherwise specified, the order of the processes can be modified. Thus, the illustrated embodiments should be understood only as examples, and the illustrated processes can be performed in a different order, and some processes can be performed concurrently. Additionally, at least one process can be omitted in various embodiments. Thus, not all processes are required in every embodiment. Other process flows are possible.

In FIG. 3, an embodiment of a skill embedding generator 300 includes structural components (e.g., computer programs and/or data structures), including skill terms 302, a skill expansion prompt generator 304, a large language model 306, expanded skill terms 308, a skill embedding prompt generator 310, a large language model 312, skill embeddings 314, a skill embedding store 316, links 320, and skill data store 318.

Skill expansion prompt generator 304 and skill embedding prompt generator 310 can be implemented as components of skill embedding generator 202, described above. Skill embedding store 316 can be implemented as a component of embedding store 130, described above. Skill data store 318 can be implemented as a component of skill data store 140, described above. Links 320 can be implemented as components of skill data store 318 and/or skill embedding store 316. For example, links 320 can be implemented as unique identifiers or keys that link skill data stored in skill data store 318 with corresponding skill embeddings stored in skill embedding store 316. In some implementations, links 320 are implemented as edges in a graph, where the edges indicate relationships between skill data and associated skill embeddings.

Large language models 306, 312 can be implemented as components of LLMs 132, described above, or as other types of large language models. LLMs 306, 312 can be implemented as the same LLM or as different LLMs, depending upon the requirements of a particular design or implementation of the skill embedding generator 300.

In FIG. 3, skill expansion prompt generator 304 receives skill terms 302 as input. The skill terms 302 include, for example, names of skills that are concise, e.g., 1-3 words in length. The skill terms 302 can include standardized or canonical skill names such as skill names obtained from a pre-existing, e.g., manually curated, taxonomy. Alternatively or in addition, the skill terms 302 can include non-standardized skill names, such as skill names that have been extracted from an unstructured document via, e.g., an automated entity extraction process, but which have not been mapped to standardized or canonical skill names. Further alternatively or in addition, the skill terms 302 can include standardized skill names obtained from a taxonomy that has been automatically generated by a generative LLM based on a document corpus. For example, an LLM can be used to generate a taxonomy of standardized skill names from a corpus of online job postings, user profiles, and/or company profiles. While not specifically shown in FIG. 3, skill terms 302 may be stored in skill data store 318.

In response to input including skill terms 302, skill expansion prompt generator 304 formulates or configures a skill expansion prompt including the skill terms 302. The skill expansion prompt is configured to cause the LLM 306 to generate, for each skill term 302, an expanded skill term 308, e.g., a natural language skill description.

To formulate the skill expansion prompt, embodiments of skill expansion prompt generator 304 can configure a pre-existing prompt or prompt template obtained from a library of prompt templates. A prompt template can include one or more pre-defined sections, such as instructions, examples, context, and constraints, as well as placeholders or tags that indicate parameters or arguments. Any one or more of the prompt sections may be formatted as natural language statements that may include structured or tagged portions.

Skill expansion prompt instructions include statements that instruct the LLM 306 to perform certain processing operations on the input including the skill terms 302 and/or on output of a previous instruction. An example of an instruction is, "Generate a one or two sentence description of this skill: #skill," where #skill is a placeholder for a skill term 302.

Skill expansion examples included in the skill expansion prompt constrain the LLM 306's skill expansion to the provided examples to prevent or reduce the likelihood of LLM hallucination. For instance, few-shot examples can include sample skill descriptions that have been obtained from one or more reference sources, such as user profiles, job postings, dictionaries, and/or other sources. Alternatively or in addition, few-shot examples can include skill descriptions that have been previously generated by the LLM 306 that have resulted in high quality embeddings, as determined based on, e.g., historical engagement data.

Skill expansion prompt context may supplement the instructions with task-specific information to further prevent or reduce the likelihood of LLM hallucination. For example, where a skill term could have two different meanings, the context may include information that informs the LLM 306 of the appropriate context for disambiguation. For instance, "design" could refer to graphic design or computer system design, and the prompt context may specify or reference information about the relevant industry.

Skill expansion prompt constraints may include, for example, input and/or output specifications, such as length limitations, format, and tone. Examples of constraints include "Use professional language" and "Generate the description from the perspective of a professional hiring manager."

An illustrative example of a skill expansion prompt may include the following natural language statement: "MSWord is the skill of using Microsoft Word software for a writing or document processing task."

The expanded skill terms 308, i.e., the natural language skill descriptions generated by the LLM 306, are input to skill embedding prompt generator 310. In response to input including the expanded skill terms 308, skill embedding prompt generator 310 formulates or configures a skill embedding prompt including the expanded skill terms 308. The skill embedding prompt is configured to cause the LLM 312 to generate, for each expanded skill term 308, a skill embedding 314. For instance, although the LLM 312 may be capable of generating non-embedding output, the skill embedding prompt formulated or configured by skill embedding prompt generator 310 includes an instruction that causes the LLM 312 to output embeddings instead of decoding the embeddings to produce natural language output.

To formulate the skill embedding prompt, embodiments of skill embedding prompt generator 310 can configure a pre-existing prompt or prompt template obtained from a library of prompt templates. A prompt template can include one or more pre-defined sections, such as instructions, examples, context, and constraints, as well as placeholders or tags that indicate parameters or arguments. Any one or more of the prompt sections may be formatted as natural language statements that may include structured or tagged portions.

Skill embedding prompt instructions include statements that instruct the LLM 312 to perform certain processing operations on the input including the expanded skill terms 308 and/or on output of a previous instruction. An example of an instruction is, "Generate an embedding for this skill description: #skill_description," where #skill_description is a placeholder for an expanded skill term 308, e.g., the output of LLM 306.

Examples included in the skill embedding prompt can constrain the LLM 312's embedding generation to the provided examples to prevent or reduce the likelihood of LLM hallucination. For instance, few-shot examples can include sample skill embeddings that have been obtained from one or more reference sources or which have been previously generated by the LLM 312 that have resulted in high quality user to content item matchings, as determined based on, e.g., historical engagement data.

Skill embedding prompt context may supplement the instructions with task-specific information to further prevent or reduce the likelihood of LLM hallucination. For example, where an expanded skill term could have multiple different interpretations, the context may include information that informs the LLM 312 of the appropriate context for disambiguation or how to determine the appropriate context. For instance, the skill embedding prompt could instruct the LLM 312 to use retrieval augmented generation (RAG) to obtain context information given the expanded skill term and/or other parameters.

Skill embedding prompt constraints may include, for example, input and/or output specifications, such as the number of dimensions to include in the skill embedding vector.

The LLM-generated skill embeddings 314 are stored in skill embedding store 316 and linked with the corresponding skill data in skill data store 318 via links 320. For example, a unique skill identifier or skill ID is used as a link 320 that associates a skill embedding 314 with its corresponding skill term 302.

The examples shown in FIG. 3 and the accompanying description, above are provided for illustration purposes. This disclosure is not limited to the described examples. Additional or alternative details and implementations are described herein.

FIG. 4 is a flow diagram of an example method for generating skill-centric document embeddings using components of a skill-centric embedding and ranking system and a large language model in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of a skill-centric embedding and ranking system, including, in some embodiments, components or flows shown in FIG. 4 that may not be specifically shown in other figures and/or including, in some embodiments, components or flows shown in other figures that may not be specifically shown in FIG. 4. Although shown in a particular sequence or order, unless otherwise specified, the order of the processes can be modified. Thus, the illustrated embodiments should be understood only as examples, and the illustrated processes can be performed in a different order, and some processes can be performed concurrently. Additionally, at least one process can be omitted in various embodiments. Thus, not all processes are required in every embodiment. Other process flows are possible.

In FIG. 4, an embodiment of a document embedding generator 400 includes structural components (e.g., computer programs and/or data structures), including documents 402, a document embedding prompt generator 404, a large language model 406, generic document embeddings 408, an embedding-based retrieval and ranking component 410, skill embeddings 414, a skill embedding store 412, an embedding aggregator 416, and skill-centric document embeddings 418.

Document embedding prompt generator 404 can be implemented as a component of document embedding generator 208, described above. Large language model 406 can be implemented as a component of LLMs 132, described above, or as other types of large language models. Skill embedding store 412 can be implemented as a component of embedding store 130, described above. For example, skill embedding store 412 stores skill embeddings generated by the process shown in FIG. 3, described above.

In the embodiment of FIG. 4, documents 402 are input to a document embedding prompt generator 404. Examples of documents 402 include articles, such as AI-generated article starters, and other types of digital content items that may be accessible via an online system such as a PSN. The document embedding prompt generator 404 configures or formulates document embedding prompts for input to large language model 406, based on documents 402. To formulate a document embedding prompt, embodiments of document embedding prompt generator 404 can configure a pre-existing prompt or prompt template obtained from a library of prompt templates. A document embedding prompt template can include one or more pre-defined sections, such as instructions, examples, context, and constraints, as well as placeholders or tags that indicate parameters or arguments. Any one or more of the prompt sections may be formatted as natural language statements that may include structured or tagged portions.

Document embedding prompt instructions include one or more statements that instruct the LLM 406 to perform certain processing operations on the input including the documents 402. An example of an instruction is, "Generate an embedding for this document: #document_ID," where #document_ID is a placeholder for a document 402.

Examples included in the document embedding prompt can constrain the LLM 406's embedding generation to the provided examples to prevent or reduce the likelihood of LLM hallucination. For instance, few-shot examples can include sample document embeddings that have been obtained from one or more reference sources or which have been previously generated by the LLM 406 that have resulted in high quality user to content item matchings, as determined based on, e.g., historical engagement data.

Document embedding prompt context may supplement the instructions with task-specific information to further prevent or reduce the likelihood of LLM hallucination. For example, where a document covers multiple different topics, the context may include information that informs the LLM 406 of the most relevant topic or topics for disambiguation or how to determine the most relevant topics. For instance, the document embedding prompt could instruct the LLM 406 to use retrieval augmented generation (RAG) to obtain context information given the document 402 and/or other parameters.

Document embedding prompt constraints may include, for example, input and/or output specifications, such as the number of dimensions to include in the document embedding vector.

The LLM-generated document embeddings 408 are considered generic because they do not explicitly represent skill data. For example, the generic document embedding 408 for a given document 402 is generated by the LLM 406 based on the document as a whole and not specifically with respect to any particular skills that may be mentioned in the document. The generic document embeddings 408 may be cached, stored, or otherwise made accessible to embedding-based retrieval and ranking component 410.

Embedding-based retrieval and ranking component 410 uses EBR to match generic document embeddings 408 with one or more skill embeddings obtained from skill data store 412. For example, given a particular generic document embedding 408, embedding-based retrieval and ranking component 410 uses a nearest neighbor algorithm to find the top k skill embeddings (which have been generated using the skill embedding generation approaches described herein) that most closely match the generic document embedding 408, where k is a positive integer whose value is configurable based on the requirements of a particular design or implementation of the document embedding generator 400.

For a given generic document embedding 408, embedding-based retrieval and ranking component 410 identifies and outputs the matched skill embeddings 414 that correspond to the generic document embedding 408 for input to embedding aggregator 416. For a given document 402, embedding aggregator 416 receives the matched skill embeddings 414 for the associated generic document embedding 408 and aggregates the matched skill embeddings 414 to create a skill-centric document embedding 418 for the document 402. To aggregate the matched skill embeddings 414, embedding aggregator 416 applies an aggregation function to the matched skill embeddings 414, such as a mean, average, or other suitable aggregation function depending on the requirements of a particular design or implementation. The resulting skill-centric document embedding 418 created by document embedding generator 400 for a document 402 includes an aggregation of skill embeddings 414 that match the generic document embedding 408 of the document 402, where the skill embeddings have been pre-created using one or more LLMs as described above.

The examples shown in FIG. 4 and the accompanying description, above are provided for illustration purposes. This disclosure is not limited to the described examples. Additional or alternative details and implementations are described herein.

FIG. 5 is a flow diagram of an example method for generating skill-centric user embeddings using components of a skill-centric embedding and ranking system in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of a skill-centric embedding and ranking system, including, in some embodiments, components or flows shown in FIG. 5 that may not be specifically shown in other figures and/or including, in some embodiments, components or flows shown in other figures that may not be specifically shown in FIG. 5. Although shown in a particular sequence or order, unless otherwise specified, the order of the processes can be modified. Thus, the illustrated embodiments should be understood only as examples, and the illustrated processes can be performed in a different order, and some processes can be performed concurrently. Additionally, at least one process can be omitted in various embodiments. Thus, not all processes are required in every embodiment. Other process flows are possible.

In FIG. 5, an embodiment of a user embedding generator 206 includes structural components (e.g., computer programs and/or data structures), including user profiles 502, role data 504, a key phrase extractor 506, a key phrase 508, a skill data store 510, a key phrase to skill mapper 512, skill terms 514, an embedding-based retrieval and ranking component 516, a skill embedding store 518, skill embeddings 520, an embedding aggregator 522, and skill-centric user embeddings 524. Skill embedding store 518 can be implemented as a component of embedding store 130, described above. Skill data store 510 can be implemented as a component of skill data store 140, described above.

In FIG. 5, a user of an online system (e.g., a PSN) is identified for matching with a set of one or more content items. For example, the user is identified as a potential contributor to one or more documents, such as AI-generated starter articles, via the online system, but the set of most relevant documents has not yet been determined. The user embedding generator 206 creates a skill-centric user embedding 524, which can be used to determine a set of relevant documents for the user.

In the example of FIG. 5, the identified user's online profile 502 is input to a key phrase extractor 506. In the context of a PSN, the online profile 502 includes professional biographical information such as job titles, work experience, educational background, and/or other credentials. The key phrase extractor 506 extracts one or more key phrases 508 from the user profile 502. In some implementations, the key phrase extractor 506 is a rule-based extractor that extracts the user's most recent job title from the online profile 502 and uses the most recent job title as the key phrase 508. In other implementations, the key phrase extractor 506 may include a parser that tags portions of the user profile 502 with semantic descriptors or categories and then selects one or more key phrases 508 from the user profile 502 based on the tags.

For a given key phrase 508, the key phrase to skill mapper 512 maps the key phrase 508 to one or more skill terms 514. For example, the key phrase to skill mapper 512 queries or searches skill data store 510 or an index of skill data store 510 to identify skill terms 514 that are associated with the key phrase 508. The key phrase to skill mapper 512 outputs the skill terms 514 that are associated with the key phrase 508 and provides the skill terms 514 for input to embedding-based retrieval and ranking component 516. Embedding-based retrieval and ranking component 516 searches skill embedding store 518 for skill embeddings (i.e., skill embeddings that have been created using one or more LLMs as described herein) that match the skill terms 514.

In some implementations, role data 504 is provided to embedding-based retrieval and ranking component 516, and embedding-based retrieval and ranking component 516 configures the search of skill embedding store 518 based on the role data 504. The role data 504 can be determined based on user activity data obtained via, e.g., logging service 108. For example, user activity data logged by logging service 108 may indicate that the user has performed several job searches, indicating that the user's current role is a job seeker, or the user activity data may indicate that the user has most recently viewed learning videos on a particular topic, indicating that the user's current role is a knowledge seeker, or that the user has most recently shared a paper that they authored with their network, indicating that the user is a potential contributor to an article on the topic of their paper or a related topic.

To configure the search of skill embedding data store 518 based on role data 504, the embedding-based retrieval and ranking component 516 may apply a set of rules to the role data 504. For example, if the user's current role is a knowledge seeker, the embedding-based retrieval and ranking component 516 may search the skill embedding store for embeddings of skills that do not overlap with the skill terms 514. If the user's current role is a potential contributor to an article, the embedding-based retrieval and ranking component 516 may search the skill embedding store for embeddings of skills that significantly overlap with the skill terms 514.

Embedding-based retrieval and ranking component 516 uses EBR to match skill terms 514 and/or role data 504 with one or more skill embeddings obtained from skill data store 518. For example, given a set of skill terms 514 and/or role data 504, embedding-based retrieval and ranking component 516 uses a nearest neighbor algorithm to find the top k skill embeddings (which have been generated using the skill embedding generation approaches described herein) that most closely match the skill terms 514 and/or role data 504, where k is a positive integer whose value is configurable based on the requirements of a particular design or implementation of the user embedding generator 206.

The embedding-based retrieval and ranking component 516 outputs skill embeddings 520 retrieved from skill embedding store 518 based on the skill terms 514 and/or role data 504. The skill embeddings 520 are input to embedding aggregator 522.

For a given user profile 502, embedding aggregator 522 receives the skill embeddings 520 and aggregates the skill embeddings 520 to create a skill-centric user embedding 524. To aggregate the skill embeddings 520, embedding aggregator 522 applies an aggregation function to the skill embeddings 520, such as a mean, average, or other suitable aggregation function depending on the requirements of a particular design or implementation. The resulting skill-centric user embedding 524 created by user embedding generator 500 for a user profile 502 includes an aggregation of skill embeddings 520 that match the skill terms 514 and/or role data 504, where the skill embeddings have been pre-created using one or more LLMs as described above. The skill-centric user embedding 524 can be used to identify a set of matching skill-centric document embeddings.

The examples shown in FIG. 5 and the accompanying description, above are provided for illustration purposes. This disclosure is not limited to the described examples. Additional or alternative details and implementations are described herein.

Figure 6:
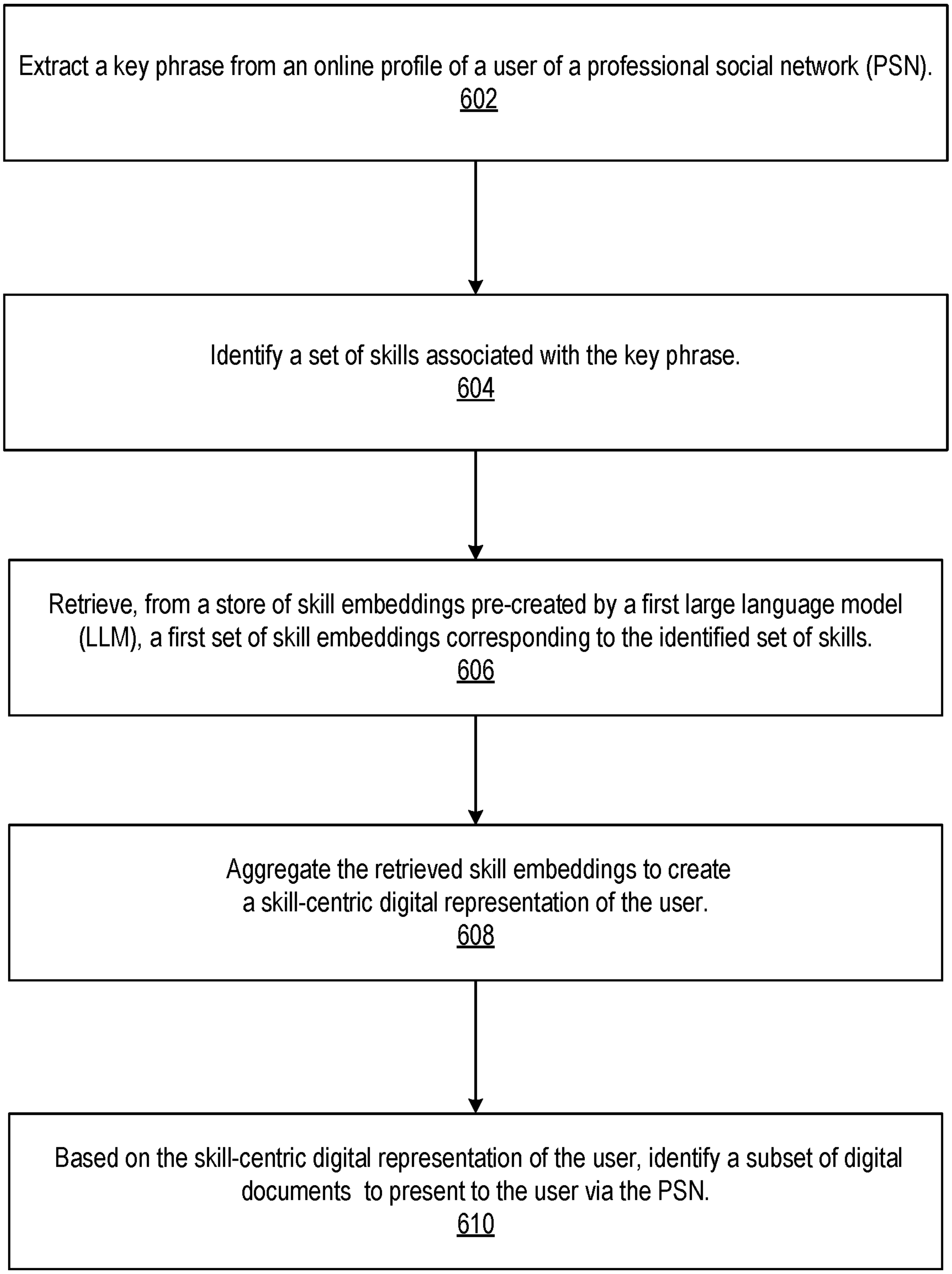
FIG. 6 is a flow diagram of an example method for skill-centric embedding and ranking using components of a skill-centric embedding generator in accordance with some embodiments of the present disclosure.

FIG. 6 is a flow diagram of an example method for skill-centric embedding and ranking using components of a skill-centric embedding generator in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of a skill-centric embedding and ranking system, including, in some embodiments, components or flows shown in FIG. 6 that may not be specifically shown in other figures and/or including, in some embodiments, components or flows shown in other figures that may not be specifically shown in FIG. 6. Although shown in a particular sequence or order, unless otherwise specified, the order of the processes can be modified. Thus, the illustrated embodiments should be understood only as examples, and the illustrated processes can be performed in a different order, and some processes can be performed concurrently. Additionally, at least one process can be omitted in various embodiments. Thus, not all processes are required in every embodiment. Other process flows are possible.

In operation 602, the processing device extracts a key phrase from an online profile of a user of a professional social network (PSN). In operation 604, the processing device identifies a set of skills associated with the key phrase extracted from the online profile at operation 602. In some implementations, the key phrase includes a job title and identifying the set of skills associated with the key phrase includes mapping the job title to the set of skills. In some implementations, identifying the set of skills includes searching a digital taxonomy for canonical skill names that correspond to the key phrase.

In operation 606, the processing device retrieves, from a store of skill embeddings pre-created by a first large language model (LLM), a first set of skill embeddings corresponding to the set of skills. In some implementations, a skill embedding of a skill is pre-created by the first LLM by: sending a first prompt including the skill to the first LLM, receiving a natural language description of the skill from the first LLM in response to the first prompt, sending a second prompt including the natural language description of the skill to the first LLM, and receiving the skill embedding from the first LLM in response to the second prompt.

In operation 608, the processing device aggregates the retrieved skill embeddings to create a skill-centric digital representation of the user. For example, the processing device computes the mean or average of the retrieved skill embeddings.

In operation 610, based on the skill-centric digital representation of the user, the processing device identifies a subset of digital documents to present to the user via the PSN. In some implementations, the processing device, for a document of the identified subset of digital documents, generates a skill-centric digital representation of the document by: sending a first prompt including the document to the first LLM, receiving a document embedding from the first LLM in response to the first prompt, retrieving, from the store of skill embeddings pre-created by the first LLM, a second set of skill embeddings corresponding to the document embedding, and aggregating the retrieved skill embeddings to create the skill-centric digital representation of the document. In some implementations, the document of the subset of digital documents includes digital content generated by a generative artificial intelligence model.

In some implementations, the processing device sends a digital invitation to the user to contribute digital content to at least one of the documents in the identified subset of digital documents via the PSN. In some implementations, the processing device receives digital feedback from the PSN in response to the digital invitation and fine tunes the first LLM based on the digital feedback.

In some implementations, the processing device identifies the subset of digital documents to which the user may contribute digital content via the PSN by algorithmically matching the skill-centric digital representation of the user with the skill-centric digital representation of the document. In some implementations, the processing device configures the algorithmic matching based on a role of the user on the PSN. In some implementations, the processing device, in response to the role being a knowledge seeker, decreasing a matching threshold; and in response to the role being a knowledge contributor, increasing the matching threshold. In some implementations, the processing device configures the algorithmic matching based on engagement data associated with the PSN and at least one of the user or the document.

The examples shown in FIG. 6 and the accompanying description, above are provided for illustration purposes. This disclosure is not limited to the described examples. Additional or alternative details and implementations are described herein.

Figure 7:
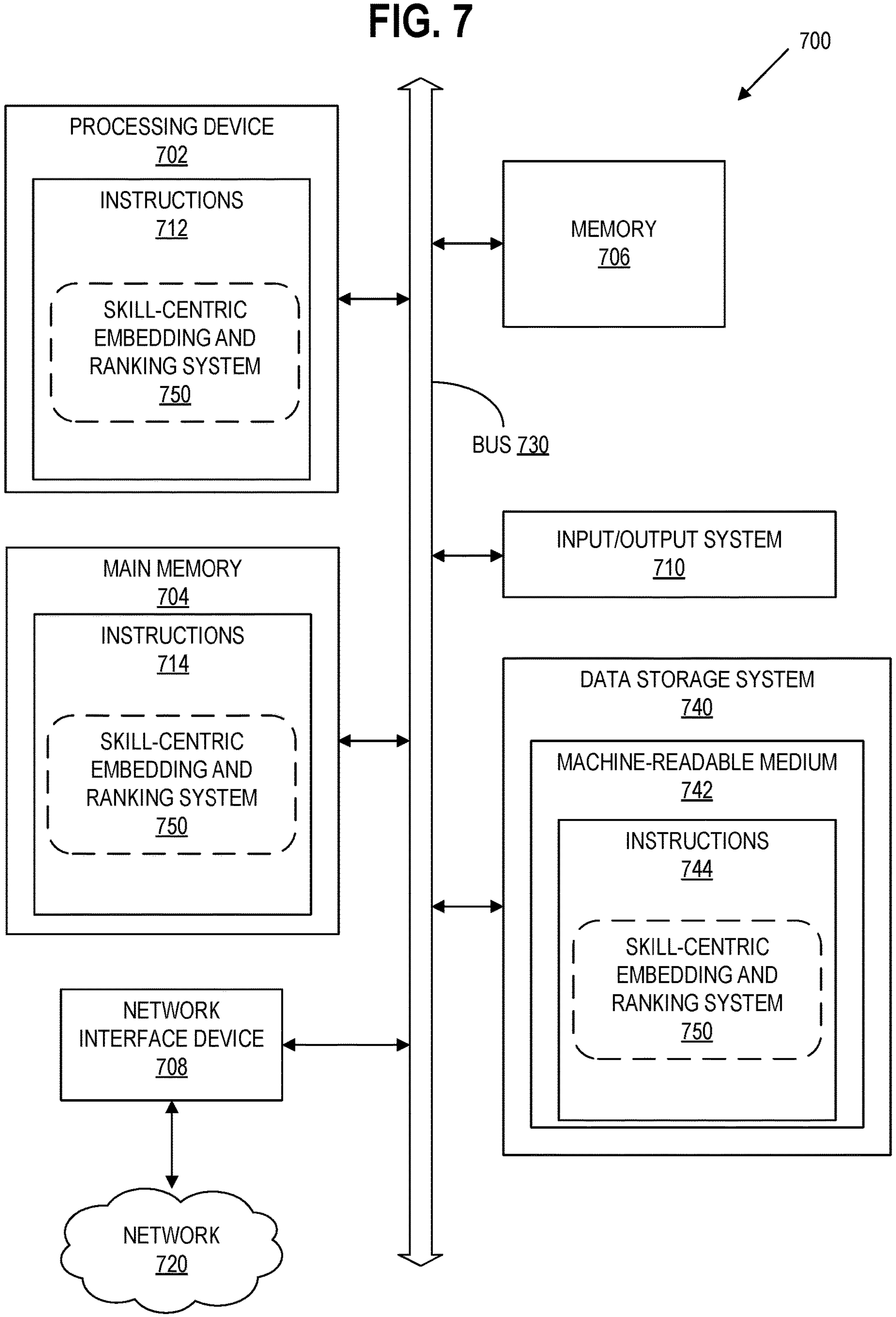
FIG. 7 is a block diagram of an example computer system including components of a skill-centric embedding and ranking system in accordance with some embodiments of the present disclosure.

FIG. 7 is a block diagram of an example computer system including components of a skill-centric embedding and ranking system in accordance with some embodiments of the present disclosure.

In FIG. 7, an example machine of a computer system 700 is shown, within which a set of instructions, for causing the machine to perform any of the methodologies discussed herein, can be executed. In some embodiments, the computer system 700 can correspond to a component of a networked computer system that includes, is coupled to, or utilizes a machine to execute an operating system to perform operations corresponding to one or more components of the skill-centric embedding and ranking system.

The machine is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a memory 23023 (e.g., flash memory, static random access memory (SRAM), etc.), an input/output system 710, and a data storage system 740, which communicate with each other via a bus 730.

Processing device 702 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be at least one special-purpose processing device such as an application specific integrated circuit (ASIC), a field programmable gate array (FPGA), a digital signal processor (DSP), network processor, or the like. The processing device 702 is configured to execute instructions 712 for performing the operations and steps discussed herein.

Instructions 712 include portions of skill-centric embedding and ranking system 750 when those portions of the skill-centric embedding and ranking system 750 are being executed by processing device 702. Thus, the skill-centric embedding and ranking system 750 is shown in dashed lines as part of instructions 712 to illustrate that, at times, portions of the skill-centric embedding and ranking system 750 are executed by processing device 702. For example, when at least some portion of the skill-centric embedding and ranking system 750 is embodied in instructions to cause processing device 702 to perform the method(s) described above, some of those instructions can be read into processing device 702 (e.g., into an internal cache or other memory) from main memory 704 and/or data storage system 740. However, it is not required that all of the skill-centric embedding and ranking system 750 be included in instructions 712 at the same time and portions of the skill-centric embedding and ranking system 750 are stored in at least one other component of computer system 700 at other times, e.g., when at least one portion of the skill-centric embedding and ranking system 750 are not being executed by processing device 702.

The computer system 700 further includes a network interface device 708 to communicate over the network 720. Network interface device 708 provides a two-way data communication coupling to a network. For example, network interface device 708 can be an integrated-services digital network (ISDN) card, cable modem, satellite modem, or a modem to provide a data communication connection to a corresponding type of telephone line. As another example, network interface device 708 can be a local area network (LAN) card to provide a data communication connection to a compatible LAN. Wireless links can also be implemented. In any such implementation network interface device 708 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 700.

Computer system 700 can send messages and receive data, including program code, through the network(s) and network interface device 708. In the Internet example, a server can transmit a requested code for an application program through the Internet and network interface device 708. The received code can be executed by processing device 702 as it is received, and/or stored in data storage system 740, or other non-volatile storage for later execution.

The input/output system 710 includes an output device, such as a display, for example a liquid crystal display (LCD) or a touchscreen display, for displaying information to a computer user, or a speaker, a haptic device, or another form of output device. The input/output system 710 can include an input device, for example, alphanumeric keys and other keys configured for communicating information and command selections to processing device 702. An input device can, alternatively or in addition, include a cursor control, such as a mouse, a trackball, or cursor direction keys for communicating direction information and command selections to processing device 702 and for controlling cursor movement on a display. An input device can, alternatively or in addition, include a microphone, a sensor, or an array of sensors, for communicating sensed information to processing device 702. Sensed information can include voice commands, audio signals, geographic location information, and/or digital imagery, for example.

The data storage system 740 includes a machine-readable storage medium 742 (also known as a computer-readable medium) on which is stored at least one set of instructions 744 or software embodying any of the methodologies or functions described herein. The instructions 744 can also reside, completely or at least partially, within the main memory 704 and/or within the processing device 702 during execution thereof by the computer system 700, the main memory 704 and the processing device 702 also constituting machine-readable storage media.

In one embodiment, the instructions 744 include instructions to implement functionality corresponding to a skill-centric embedding and ranking system.

Dashed lines are used in FIG. 7 to indicate that it is not required that the skill-centric embedding and ranking system be embodied entirely in instructions 712, 714, and 744 at the same time. In one example, portions of the skill-centric embedding and ranking system are embodied in instructions 744, which are read into main memory 704 as instructions 714, and portions of instructions 714 are read into processing device 702 as instructions 712 for execution. In another example, some portions of the skill-centric embedding and ranking system are embodied in instructions 744 while other portions are embodied in instructions 714 and still other portions are embodied in instructions 712.

While the machine-readable storage medium 742 is shown in an example embodiment to be a single medium, the term "machine-readable storage medium" should be taken to include a single medium or multiple media that store the at least one set of instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media. The examples shown in FIG. 7 and the accompanying description, above, are provided for illustration purposes. This disclosure is not limited to the described examples.

Some portions of the preceding detailed description have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 800, can carry out the above-described computer-implemented methods in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

According to some embodiments, the techniques for the models described herein do not make inferences or predictions about individuals unless requested to do so through an input. According to some embodiments, the models described herein do not learn from and are not trained on user data without user authorization. In instances where user data is permitted and authorized for use in AI features and tools, it is done in compliance with a user's visibility settings, privacy choices, user agreement and descriptions, and the applicable law. According to the techniques described herein, users may have full control over the visibility of their content and who sees their content, as is controlled via the visibility settings. According to the techniques described herein, users may have full control over the level of their personal data that is shared and distributed between different AI platforms that provide different functionalities. According to the techniques described herein, users may have full control over the level of access to their personal data that is shared with other parties. According to the techniques described herein, personal data provided by users may be processed to determine prompts when using a generative AI feature at the request of the user, but not to train generative AI models. In some embodiments, users may provide feedback while using the techniques described herein, which may be used to improve or modify the platform and products. In some embodiments, any personal data associated with a user, such as personal information provided by the user to the platform, may be deleted from storage upon user request. In some embodiments, personal information associated with a user may be permanently deleted from storage when a user deletes their account from the platform.

According to the techniques described herein, personal data may be removed from any training dataset that is used to train AI models. The techniques described herein may utilize tools for anonymizing member and customer data. For example, user's personal data may be redacted and minimized in training datasets for training AI models through delexicalisation tools and other privacy enhancing tools for safeguarding user data. The techniques described herein may minimize use of any personal data in training AI models, including removing and replacing personal data. According to the techniques described herein, notices may be communicated to users to inform how their data is being used and users are provided controls to opt-out from their data being used for training AI models.

According to some embodiments, tools are used with the techniques described herein to identify and mitigate risks associated with AI in all products and AI systems. In some embodiments, notices may be provided to users when AI tools are being used to provide features.

Illustrative examples of the technologies disclosed herein are provided below. An embodiment of the technologies may include any of the examples described below, or any combination of any of the examples described below, or any combination of any portions of the examples described below.

In some aspects, the techniques described herein relate to a method including: extracting a key phrase from an online profile of a user of a professional social network (PSN); identifying a set of skills associated with the key phrase; retrieving, from a store of skill embeddings pre-created by a first large language model (LLM), a first set of skill embeddings corresponding to the set of skills; aggregating the retrieved skill embeddings to create a skill-centric digital representation of the user; and based on the skill-centric digital representation of the user, identifying a subset of digital documents to present to the user via the PSN.

In some aspects, the techniques described herein relate to a method, further including: sending a digital invitation to the user to contribute digital content to at least one of the documents in the identified subset of digital documents via the PSN.

In some aspects, the techniques described herein relate to a method, further including: receiving digital feedback from the PSN in response to the digital invitation; and fine tuning the first LLM based on the digital feedback.

In some aspects, the techniques described herein relate to a method, wherein a skill embedding of a skill is pre-created by the first LLM by: sending a first prompt including the skill to the first LLM; receiving a natural language description of the skill from the first LLM in response to the first prompt; sending a second prompt including the natural language description of the skill to the first LLM; and receiving the skill embedding from the first LLM in response to the second prompt.

In some aspects, the techniques described herein relate to a method, further including, for a document of the identified subset of digital documents, generating a skill-centric digital representation of the document by: sending a first prompt including the document to the first LLM; receiving a document embedding from the first LLM in response to the first prompt; retrieving, from the store of skill embeddings pre-created by the first LLM, a second set of skill embeddings corresponding to the document embedding; and aggregating the retrieved skill embeddings to create the skill-centric digital representation of the document.

In some aspects, the techniques described herein relate to a method, wherein the document includes digital content generated by a generative artificial intelligence model.

In some aspects, the techniques described herein relate to a method, wherein identifying the subset of digital documents to which the user may contribute digital content via the PSN includes: algorithmically matching the skill-centric digital representation of the user with the skill-centric digital representation of the document.

In some aspects, the techniques described herein relate to a method, further including: configuring the algorithmic matching based on a role of the user on the PSN.

In some aspects, the techniques described herein relate to a method, further including: in response to the role being a knowledge seeker, decreasing a matching threshold; and in response to the role being a knowledge contributor, increasing the matching threshold.

In some aspects, the techniques described herein relate to a method, further including: configuring the algorithmic matching based on engagement data associated with the PSN and at least one of the user or the document.

In some aspects, the techniques described herein relate to a method, further including: using the skill to configure a skill expansion prompt; and using the skill expansion prompt, receiving an expanded version of the skill from the first LLM.

In some aspects, the techniques described herein relate to a method, wherein identifying the set of skills includes searching a digital taxonomy for canonical skill names that correspond to the key phrase.

In some aspects, the techniques described herein relate to a system including: at least one processor; and at least one memory coupled to the at least one processor; wherein the at least one memory includes at least one instruction which, when executed by the at least one processor, causes the at least one processor to perform at least one operation including: extracting a key phrase from an online profile of a user of a professional social network (PSN); identifying a set of skills associated with the key phrase; retrieving, from a store of skill embeddings pre-created by a first large language model (LLM), a first set of skill embeddings corresponding to the set of skills; aggregating the retrieved skill embeddings to create a skill-centric digital representation of the user; based on the skill-centric digital representation of the user, identifying a subset of digital documents to present to the user via the PSN; and sending a digital invitation to the user to contribute digital content to at least one of the documents in the identified subset of digital documents via the PSN.

In some aspects, the techniques described herein relate to a system, wherein the at least one instruction, when executed by the at least one processor, causes the at least one processor to perform at least one operation including: receiving digital feedback from the PSN in response to the digital invitation; and fine tuning the first LLM based on the digital feedback.

In some aspects, the techniques described herein relate to a system, wherein a skill embedding of a skill is pre-created by the first LLM by: sending a first prompt including the skill to the first LLM; receiving a natural language description of the skill from the first LLM in response to the first prompt; sending a second prompt including the natural language description of the skill to the first LLM; and receiving the skill embedding from the first LLM in response to the second prompt.

In some aspects, the techniques described herein relate to a system, further including, for a document of the identified subset of digital documents, generating a skill-centric digital representation of the document by: sending a first prompt including the document to the first LLM; receiving a document embedding from the first LLM in response to the first prompt; retrieving, from the store of skill embeddings pre-created by the first LLM, a second set of skill embeddings corresponding to the document embedding; and aggregating the retrieved skill embeddings to create the skill-centric digital representation of the document.

In some aspects, the techniques described herein relate to at least one non-transitory machine readable storage medium including at least one instruction which, when executed by at least one processor, causes the at least one processor to perform at least one operation including: extracting a key phrase from an online profile of a user of a professional social network (PSN); identifying a set of skills associated with the key phrase; retrieving, from a store of skill embeddings pre-created by a first large language model (LLM), a first set of skill embeddings corresponding to the set of skills; aggregating the retrieved skill embeddings to create a skill-centric digital representation of the user; based on the skill-centric digital representation of the user, identifying a subset of digital documents to present to the user via the PSN; and sending a digital invitation to the user to contribute digital content to at least one of the documents in the identified subset of digital documents via the PSN.

In some aspects, the techniques described herein relate to an at least one non-transitory machine readable storage medium, wherein a skill embedding of a skill is pre-created by the first LLM by: sending a first prompt including the skill to the first LLM; receiving a natural language description of the skill from the first LLM in response to the first prompt; sending a second prompt including the natural language description of the skill to the first LLM; and receiving the skill embedding from the first LLM in response to the second prompt.

In some aspects, the techniques described herein relate to an at least one non-transitory machine readable storage medium, wherein the at least one instruction, when executed by the at least one processor, causes the at least one processor to perform at least one operation including, for a document of the identified subset of digital documents, generating a skill-centric digital representation of the document by: sending a first prompt including the document to the first LLM; receiving a document embedding from the first LLM in response to the first prompt; retrieving, from the store of skill embeddings pre-created by the first LLM, a second set of skill embeddings corresponding to the document embedding; and aggregating the retrieved skill embeddings to create the skill-centric digital representation of the document.

In some aspects, the techniques described herein relate to an at least one non-transitory machine readable storage medium, wherein the at least one instruction, when executed by the at least one processor, causes the at least one processor to perform at least one operation including, further including: sending a digital invitation to the user to contribute digital content to at least one of the documents in the identified subset of digital documents via the PSN; receiving digital feedback from the PSN in response to the digital invitation; and fine tuning the first LLM based on the digital feedback.

Clause 1. A method comprising: extracting a key phrase from an online profile of a user of a professional social network (PSN); identifying a set of skills associated with the key phrase; retrieving, from a store of skill embeddings pre-created by a first large language model (LLM), a first set of skill embeddings corresponding to the set of skills; aggregating the retrieved skill embeddings to create a skill-centric digital representation of the user; and based on the skill-centric digital representation of the user, identifying a subset of digital documents to present to the user via the PSN.

Clause 2. The method of clause 1, further comprising: sending a digital invitation to the user to contribute digital content to at least one of the documents in the identified subset of digital documents via the PSN.

Clause 3. The method of clause 1 or clause 2, further comprising: receiving digital feedback from the PSN in response to the digital invitation; and fine tuning the first LLM based on the digital feedback.

Clause 4. The method of any of clauses 1-3, wherein a skill embedding of a skill is pre-created by the first LLM by: sending a first prompt including the skill to the first LLM; receiving a natural language description of the skill from the first LLM in response to the first prompt; sending a second prompt including the natural language description of the skill to the first LLM; and receiving the skill embedding from the first LLM in response to the second prompt.

Clause 5. The method of any of clauses 1-4, further comprising, for a document of the identified subset of digital documents, generating a skill-centric digital representation of the document by: sending a first prompt including the document to the first LLM; receiving a document embedding from the first LLM in response to the first prompt; retrieving, from the store of skill embeddings pre-created by the first LLM, a second set of skill embeddings corresponding to the document embedding; and aggregating the retrieved skill embeddings to create the skill-centric digital representation of the document.

Clause 6. The method of any of clauses 1-5, wherein the document comprises digital content generated by a generative artificial intelligence model.

Clause 7. The method of any of clauses 1-6, wherein identifying the subset of digital documents to which the user may contribute digital content via the PSN comprises: algorithmically matching the skill-centric digital representation of the user with the skill-centric digital representation of the document.

Clause 8. The method of clause 7, further comprising: configuring the algorithmic matching based on a role of the user on the PSN.

Clause 9. The method of clause 8, further comprising: in response to the role being a knowledge seeker, decreasing a matching threshold; and in response to the role being a knowledge contributor, increasing the matching threshold.

Clause 10. The method of clause 7, further comprising: configuring the algorithmic matching based on engagement data associated with the PSN and at least one of the user or the document.

Clause 11. The method of any of clauses 1-10, further comprising: using the skill to configure a skill expansion prompt; and using the skill expansion prompt, receiving an expanded version of the skill from the first LLM.

Clause 12. The method of any of clauses 1-11, wherein identifying the set of skills comprises searching a digital taxonomy for canonical skill names that correspond to the key phrase.

Clause 13. A system comprising: at least one processor; and at least one memory coupled to the at least one processor; wherein the at least one memory comprises at least one instruction which, when executed by the at least one processor, causes the at least one processor to perform at least one operation comprising: extracting a key phrase from an online profile of a user of a professional social network (PSN); identifying a set of skills associated with the key phrase; retrieving, from a store of skill embeddings pre-created by a first large language model (LLM), a first set of skill embeddings corresponding to the set of skills; aggregating the retrieved skill embeddings to create a skill-centric digital representation of the user; based on the skill-centric digital representation of the user, identifying a subset of digital documents to present to the user via the PSN; and sending a digital invitation to the user to contribute digital content to at least one of the documents in the identified subset of digital documents via the PSN.

Clause 14. The system of clause 13, wherein the at least one instruction, when executed by the at least one processor, causes the at least one processor to perform at least one operation comprising: receiving digital feedback from the PSN in response to the digital invitation; and fine tuning the first LLM based on the digital feedback.

Clause 15. The system of clause 13 or clause 14, wherein a skill embedding of a skill is pre-created by the first LLM by: sending a first prompt including the skill to the first LLM; receiving a natural language description of the skill from the first LLM in response to the first prompt; sending a second prompt including the natural language description of the skill to the first LLM; and receiving the skill embedding from the first LLM in response to the second prompt.

Clause 16. The system of any of clauses 13-15, further comprising, for a document of the identified subset of digital documents, generating a skill-centric digital representation of the document by: sending a first prompt including the document to the first LLM; receiving a document embedding from the first LLM in response to the first prompt; retrieving, from the store of skill embeddings pre-created by the first LLM, a second set of skill embeddings corresponding to the document embedding; and aggregating the retrieved skill embeddings to create the skill-centric digital representation of the document.

Clause 17. At least one non-transitory machine readable storage medium comprising at least one instruction which, when executed by at least one processor, causes the at least one processor to perform at least one operation comprising: extracting a key phrase from an online profile of a user of a professional social network (PSN); identifying a set of skills associated with the key phrase; retrieving, from a store of skill embeddings pre-created by a first large language model (LLM), a first set of skill embeddings corresponding to the set of skills; aggregating the retrieved skill embeddings to create a skill-centric digital representation of the user; based on the skill-centric digital representation of the user, identifying a subset of digital documents to present to the user via the PSN; and sending a digital invitation to the user to contribute digital content to at least one of the documents in the identified subset of digital documents via the PSN.

Clause 18. The at least one non-transitory machine readable storage medium of clause 17, wherein a skill embedding of a skill is pre-created by the first LLM by: sending a first prompt including the skill to the first LLM; receiving a natural language description of the skill from the first LLM in response to the first prompt; sending a second prompt including the natural language description of the skill to the first LLM; and receiving the skill embedding from the first LLM in response to the second prompt.

Clause 19. The at least one non-transitory machine readable storage medium of clause 17 or clause 18, wherein the at least one instruction, when executed by the at least one processor, causes the at least one processor to perform at least one operation comprising, for a document of the identified subset of digital documents, generating a skill-centric digital representation of the document by: sending a first prompt including the document to the first LLM; receiving a document embedding from the first LLM in response to the first prompt; retrieving, from the store of skill embeddings pre-created by the first LLM, a second set of skill embeddings corresponding to the document embedding; and aggregating the retrieved skill embeddings to create the skill-centric digital representation of the document.

Clause 20. The at least one non-transitory machine readable storage medium of any of clauses 17-19, wherein the at least one instruction, when executed by the at least one processor, causes the at least one processor to perform at least one operation comprising, further comprising: sending a digital invitation to the user to contribute digital content to at least one of the documents in the identified subset of digital documents via the PSN; receiving digital feedback from the PSN in response to the digital invitation; and fine tuning the first LLM based on the digital feedback.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

by applying a first large language model (LLM) to a skill, causing the first LLM to generate and output an expanded natural language description of the skill;

by applying a second LLM to the expanded natural language description of the skill, causing the second LLM to generate and output a skill embedding of the expanded natural language description of the skill;

storing the skill embedding of the expanded natural language description of the skill in a store of skill embeddings, wherein the store of skill embeddings comprises links between skills and skill embeddings;

extracting a key phrase from an online profile of a user of an application system;

identifying a set of skills associated with the key phrase;

based on the identified set of skills, retrieving, from the store of skill embeddings, the skill embedding of the expanded natural language description of the skill;

creating a skill-centric digital representation of the user based on the skill embedding retrieved from the store of skill embeddings; and based on the skill-centric digital representation of the user, identifying a subset of digital content to present to the user via the application system.

2. The method of claim 1, further comprising:

sending a digital invitation to the user to contribute digital content to a document in the identified subset of digital content via the application system.

3. The method of claim 2, further comprising:

receiving digital feedback from the application system in response to the digital invitation; and fine tuning the second LLM based on the digital feedback.

4. The method of claim 1, wherein a skill embedding of a skill is pre-created by the second LLM by:

sending a first prompt including the skill to the second LLM;

receiving a natural language description of the skill from the second LLM in response to the first prompt;

sending a second prompt including the natural language description of the skill to the second LLM; and receiving the skill embedding from the second LLM in response to the second prompt.

5. The method of claim 1, further comprising, for a document of the identified subset of digital content, generating a skill-centric digital representation of the document by:

sending a first prompt including the document to the second LLM;

receiving a document embedding from the second LLM in response to the first prompt;

retrieving, from the store of skill embeddings pre-created by the second LLM, a second set of skill embeddings corresponding to the document embedding; and aggregating the retrieved skill embeddings to create the skill-centric digital representation of the document.

6. The method of claim 1, wherein the digital content comprises digital content generated by a generative artificial intelligence model.

7. The method of claim 1, wherein identifying the subset of digital content to which the user may contribute digital content via the application system comprises:

algorithmically matching the skill-centric digital representation of the user with a skill-centric digital representation of a document.

8. The method of claim 7, further comprising:

configuring the algorithmic matching based on a role of the user on the application system;

in response to the role being a knowledge seeker, decreasing a matching threshold; and in response to the role being a knowledge contributor, increasing the matching threshold.

9. The method of claim 7, further comprising:

configuring the algorithmic matching based on engagement data associated with the application system and at least one of the user or the document.

10. The method of claim 1, wherein identifying the skill comprises searching a digital taxonomy for canonical skill names that correspond to the key phrase.

11. The method of claim 1, further comprising:

obtaining user activity data via a logging service;

determining a current role based on the user activity data;

retrieving the skill embedding from the store of skill embeddings based on the current role.

12. The method of claim 1, further comprising:

determining a skill expansion example based on historical engagement data; and constraining the generation and output of the natural language description of the skill by providing the skill expansion example to the first LLM.

13. A system comprising:

at least one processor; and at least one memory coupled to the at least one processor;

wherein the at least one memory comprises at least one instruction which, when executed by the at least one processor, causes the at least one processor to:

by applying a first large language model (LLM) to a skill, cause the first LLM to generate and output an expanded natural language description of the skill;

by applying a second LLM to the expanded natural language description of the skill, causing the second LLM to generate and output a skill embedding of the expanded natural language description of the skill;

store the skill embedding of the expanded natural language description of the skill in a store of skill embeddings, wherein the store of skill embeddings comprises links between skills and skill embeddings;

extract a key phrase from an online profile of an application system;

identify a set of skills associated with the key phrase;

based on the identified set of skills, retrieve, from the store of skill embeddings, the skill embedding of the expanded natural language description of the skill;

create a skill-centric digital representation of the user based on the skill embedding retrieved from the store of skill embeddings; and based on the skill-centric digital representation of the user, identify a subset of digital content to present to the user via the application system.

14. The system of claim 13, wherein the at least one instruction, when executed by the at least one processor, causes the at least one processor to:

receive digital feedback from the application system in response to a digital document; and fine tune the second LLM based on the digital feedback.

15. The system of claim 13, wherein a skill embedding of a skill is pre-created by the second LLM by:

sending a first prompt including the skill to the second LLM;

receiving a natural language description of the skill from the second LLM in response to the first prompt;

sending a second prompt including the natural language description of the skill to the second LLM; and receiving the skill embedding from the second LLM in response to the second prompt.

16. The system of claim 13, further comprising, for a document of the identified subset of digital content, generating a skill-centric digital representation of the document by:

sending a first prompt including the document to the second LLM;

receiving a document embedding from the second LLM in response to the first prompt;

retrieving, from the store of skill embeddings pre-created by the second LLM, a second set of skill embeddings corresponding to the document embedding; and aggregating the retrieved skill embeddings to create the skill-centric digital representation of the document.

17. At least one non-transitory machine readable storage medium comprising at least one instruction which, when executed by at least one processor, causes the at least one processor to:

by applying a first large language model (LLM) to a skill, cause the first LLM to generate and output an expanded natural language description of the skill;

by applying a second LLM to the expanded natural language description of the skill, causing the second LLM to generate and output a skill embedding of the expanded natural language description of the skill;

store the skill embedding of the expanded natural language description of the skill in a store of skill embeddings, wherein the store of skill embeddings comprises links between skills and skill embeddings;

extract a key phrase from an online profile of a user of an application system;

identify a set of skills associated with the key phrase;

based on the identified set of skills, retrieve, from the store of skill embeddings, the skill embedding of the expanded natural language description of the skill;

create a skill-centric digital representation of the user based on the skill embedding retrieved from the store of skill embeddings; and based on the skill-centric digital representation of the user, identify a subset of digital content to present to the user via the application system.

18. The at least one non-transitory machine readable storage medium of claim 17, wherein a skill embedding of a skill is pre-created by the second LLM by:

sending a first prompt including the skill to the second LLM;

receiving a natural language description of the skill from the second LLM in response to the first prompt;

sending a second prompt including the natural language description of the skill to the second LLM; and receiving the skill embedding from the second LLM in response to the second prompt.

19. The at least one non-transitory machine readable storage medium of claim 17, wherein the at least one instruction, when executed by the at least one processor, causes the at least one processor to perform at least one operation comprising, for a document of the identified subset of digital content, generating a skill-centric digital representation of the document by:

sending a first prompt including the document to the second LLM;

receiving a document embedding from the second LLM in response to the first prompt;

retrieving, from the store of skill embeddings pre-created by the second LLM, a second set of skill embeddings corresponding to the document embedding; and aggregating the retrieved skill embeddings to create the skill-centric digital representation of the document.

20. The at least one non-transitory machine readable storage medium of claim 17, wherein the at least one instruction, when executed by the at least one processor, causes the at least one processor to:

send a digital invitation to the user to contribute digital content to a document in the identified subset of digital content via the application system;

receive digital feedback from the application system in response to the digital invitation; and fine tune the second LLM based on the digital feedback.

* * * * *